(12) United States Patent
Hatakeyama

(10) Patent No.: US 8,941,762 B2
(45) Date of Patent: Jan. 27, 2015

(54) IMAGE PROCESSING APPARATUS AND IMAGE PICKUP APPARATUS USING THE SAME

(75) Inventor: Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 13/204,530

(22) Filed: Aug. 5, 2011

(65) Prior Publication Data

US 2011/0292257 A1 Dec. 1, 2011

Related U.S. Application Data

(63) Continuation of application No. PCT/JP2011/055608, filed on Mar. 10, 2011.

(30) Foreign Application Priority Data

Mar. 31, 2010 (JP) .................. 2010-082821

(51) Int. Cl.
- *H04N 9/64* (2006.01)
- *H04N 5/217* (2011.01)
- *H04N 5/222* (2006.01)
- *H04N 5/208* (2006.01)
- *H04N 9/04* (2006.01)
- *H04N 1/58* (2006.01)
- *G06T 5/00* (2006.01)

(52) U.S. Cl.
CPC .............. *H04N 9/045* (2013.01); *H04N 1/58* (2013.01); *H04N 5/208* (2013.01); *G06T 5/009* (2013.01); *G06T 2207/10024* (2013.01)
USPC ............ 348/242; 348/241; 348/370; 348/252

(58) Field of Classification Search
USPC ........... 348/222.1, 223.1, 258, 370, 252, 264, 348/241, 251, 242; 382/266, 274, 264
See application file for complete search history.

(56) References Cited

U.S. PATENT DOCUMENTS

| | | | |
|---|---|---|---|
| 2004/0165065 A1* | 8/2004 | Smith et al. | 348/175 |
| 2005/0206978 A1* | 9/2005 | Sone | 358/516 |
| 2007/0116375 A1* | 5/2007 | Utsugi et al. | 382/264 |
| 2009/0067710 A1 | 3/2009 | Kang | |
| 2009/0201411 A1* | 8/2009 | Ono | 348/345 |
| 2009/0251569 A1* | 10/2009 | Nonaka | 348/240.1 |

(Continued)

FOREIGN PATENT DOCUMENTS

| | | |
|---|---|---|
| CN | 1598907 A | 3/2005 |
| CN | 1835599 A | 9/2006 |

(Continued)

*Primary Examiner* — Sinh Tran
*Assistant Examiner* — Xi Wang
(74) *Attorney, Agent, or Firm* — Canon USA, Inc. IP Division

(57) ABSTRACT

An image is obtained with reduced chromatic aberration as well as improved sharpness.

An image processing apparatus includes image acquiring means configured to acquire an input image, and image restoration processing means configured to generate a restored image by calculating the input image and an image restoration filter that is based on a transfer function of an image pickup system that is used to form an object image as the input image, wherein the image restoration filter performs restoration so that when an object is a white point light source, a difference between spectra of two color components in the restored image is made smaller than a difference between spectra of the two color components in the input image.

13 Claims, 18 Drawing Sheets

(56) References Cited

U.S. PATENT DOCUMENTS

| | | |
|---|---|---|
| 2010/0079615 A1* | 4/2010 | Hatakeyama ............... 348/223.1 |
| 2010/0110233 A1* | 5/2010 | Ohara et al. ................. 348/240.3 |
| 2010/0141807 A1* | 6/2010 | Alon et al. .................... 348/241 |
| 2010/0214438 A1* | 8/2010 | Hayashi et al. ............. 348/229.1 |
| 2011/0285879 A1* | 11/2011 | Hatakeyama ................. 348/241 |

FOREIGN PATENT DOCUMENTS

| | | |
|---|---|---|
| JP | 2000-156816 A | 6/2000 |
| JP | 2007-028042 A | 2/2007 |
| JP | 2007-183842 A | 7/2007 |
| JP | 2008-042874 A | 2/2008 |
| JP | 2009-010944 A | 1/2009 |

* cited by examiner

IMAGE RESTORATION FILTER

TAP VALUE

TAP

FIG. 9

| NON-PROCESSING FILTER | | | | DIFFERENTIAL FILTER | | | | EDGE ENHANCEMENT FILTER | | |
|---|---|---|---|---|---|---|---|---|---|---|
| 0 | 0 | 0 | | 0 | 1 | 0 | | 0 | −1 | 0 |
| 0 | 1 | 0 | − | 1 | −4 | 1 | = | −1 | 5 | −1 |
| 0 | 0 | 0 | | 0 | 1 | 0 | | 0 | −1 | 0 |

IMAGE PROCESSING APPARATUS AND IMAGE PICKUP APPARATUS USING THE SAME

CROSS-REFERENCE TO RELATED APPLICATIONS

This application is a Continuation of International Patent Application No. PCT/JP2011/055608, filed Mar. 10, 2011, which claims the benefit of International Patent Application No. PCT/JP2010/055862, filed Mar. 31, 2010, and Japanese Patent Application No. 2010-082821, filed Mar. 31, 2010, all of which are hereby incorporated by reference herein in their entirety.

TECHNICAL FIELD

The present invention is an invention pertaining to an image processing apparatus that performs image processing, and more specifically relates to an image processing apparatus that performs image restoration (recovery).

BACKGROUND ART

Images obtained by image pickup apparatuses such as digital cameras are degraded in quality by blurring. Blurred images are caused by spherical aberration, coma aberration, curvature of field, astigmatism, and the like of image pickup optical systems. The above aberrations can be represented by the point spread function (PSF, Point Spread Function). An optical transfer function (OTF, Optical Transfer Function) that can be obtained by the Fourier transform of the point spread function (hereinafter, PSF) represents information about the aberrations in a frequency space. The optical transfer function (hereinafter, OTF) can be represented by the complex number. The absolute value of the OTF, that is, the amplitude component, is called the MTF (Modulation Transfer Function), and the phase component is called the PTF (Phase Transfer Function). Here, the phase component is represented as the phase angle using Equation 1 below. Re(OTF) and Im(OTF) are the real part and the imaginary part of the OTF, respectively.

$$PTF = \tan{-1}(Im(OTF)/Re(OTF))$$

In this manner, the optical transfer function of the image pickup optical system causes degradation in the amplitude component and phase component of an image, and in a degraded image, therefore, each point of an object is asymmetrically blurred as with coma aberration. Furthermore, chromatic aberration of magnification is caused by acquiring, as for example, RGB color components, shifted image forming positions caused by the difference in imaging magnification from one wavelength of light to another, in accordance with the spectral characteristics of the image pickup apparatus. Accordingly, image spread is caused not only by a shift in image forming position between R, G, and B but also by a shift of an image forming position from one wavelength to another within each color component, that is, a phase shift. Thus, when the point spread function is viewed in a one-dimensional cross section in each direction (azimuth direction) perpendicular to the principal ray (light ray propagating through the center of the pupil of the image pickup optical system), aberration-induced degradation of the phase component (phase degradation component) causes asymmetry in the point spread function. Further, degradation of the amplitude component (amplitude degradation component) has an influence on the spread size of the PSF in each azimuth direction.

Therefore, in order to accurately correct for image degradation caused by the image pickup optical system using image processing, it is necessary to correct the aberration-induced phase degradation component and the amplitude degradation component.

Further, a known method for correcting for the amplitude degradation component and the phase degradation component is to perform correction using information about the optical transfer function (OTF) of the image pickup optical system. This method is called image restoration or image recovery, and a process for correcting (reducing) the degradation component of an image using the information about the optical transfer function is hereinafter referred to as an image restoration process.

An overview of the image restoration process will be described hereinafter.

When a degraded image is represented by g(x, y), the original image is represented by f(x, y), and the point spread function (PSF) of an image pickup optical system that is used to acquire g(x, y) is represented by h(x, y), the equation below holds true, where * denotes convolution (convolution integral, sum of products) and (x, y) denotes the coordinates of an image in the real space.

$$g(x, y) = h(x, y) * f(x, y) \quad \text{(Equation 1)}$$

Converting the Fourier transform of Equation 1 into a display format in the frequency space yields the expression of Equation 2.

$$G(u, v) = H(u, v) \cdot F(u, v) \quad \text{(Equation 2)}$$

Here, H(u, v) is the optical transfer function (OTF) that is the Fourier transform of the point spread function (PSF) h(x, y). G(u, v) and F(u, v) are the Fourier transforms of g(x, y) and f(x, y), respectively. (u, v) denotes the frequency (coordinates) in a two-dimensional frequency space. The initial image (original image) may be obtained from the degraded image by dividing both sides of Equation 2 by H(u, v).

$$G(u, v)/H(u, v) = F(u, v) \quad \text{(Equation 3)}$$

By returning the inverse Fourier transform of F(u, v), that is, G(u, v)/H(u, v), to the real space, the original image f(x, y) can be obtained as a restored image.

By taking the inverse Fourier transform of both sides of Equation 3, Equation 3 is expressed as Equation 4.

$$g(x, y) * R(x, y) = f(x, y) \quad \text{(Equation 4)}$$

Here, the inverse Fourier transform of 1/H(u, v) is represented by R(x, y). R(x, y) is an image restoration filter.

Since the image restoration filter is based on the optical transfer function (OTF), degradation of the amplitude component and the phase component can be corrected for.

A Wiener filter capable of controlling amplification of noise is known as the image restoration filter. The Wiener filter is an image restoration filter that changes the degree of restoration in accordance with the intensity ratio (SNR, Signal to Noise Ratio) of an input signal (image signal) to a noise signal in order to reduce noise in the input image.

Further, PTL 1 discloses an image restoration filter that is an applied Wiener filter in which an image restoration filter has an adjustment coefficient α. By adjusting the parameter α, the image restoration filter is capable of changing the degree of restoration of an image in a range from a filter that outputs an input image as it is (filter that is not applied to an input image) to a filter that maximally performs image restoration (inverse filter).

Further, PTL 2 discloses an edge enhancement process as a method for correcting for phase degradation, in which an edge portion of an image is detected and the edge is enhanced.

CITATION LIST

Patent Literature

PTL 1 Japanese Patent Laid-Open No. 2007-183842
PTL 2 Japanese Patent Laid-Open No. 2000-156816

However, in order to accurately correct for (restore) image degradation caused by an image pickup optical system by using an image restoration filter, it is necessary to correct aberration for the amplitude component and the phase component (improve sharpness). Additionally, it is also necessary to reduce the difference in PSF between color components to correct for chromatic aberration.

The Wiener filter described above or the image restoration filter disclosed in PTL 1 can correct (restore) for the amplitude component and the phase component of a degraded image. However, since no consideration is given to how blur differently appears (difference) depending on the color component, color fringing may still remain in a restored image, or color fringing may be increased, even though an image restoration process has been performed.

The above problem will be specifically described with reference to FIG. 18. In FIG. 18, the broken line (a) and the solid line (b) indicate the MTFs of two color components before restoration. The broken line (c) and the solid line (d) indicate the MTFs of the color components, which are represented by (a) and (b), respectively, after restoration. The restoration process performed using the Wiener filter makes the difference between the MTFs (c) and (d) of the two color components after restoration larger than the difference between the MTFs (a) and (b) of the two color components before restoration. Since the MTFs (c) and (d) after restoration are higher than the MTFs (a) and (b), the sharpness of the image is improved. However, the difference in MTF between the color components, which appears as color fringing (chromatic aberration) in the image, increases.

Therefore, it is an object of the present invention to provide an image processing apparatus capable of reducing chromatic aberration while improving image sharpness.

SUMMARY OF INVENTION

In order to solve the above object, the present invention provides an image processing apparatus including:
image acquiring means configured to acquire an input image; and
image restoration processing means configured to generate a restored image by calculating the input image and an image restoration filter, the image restoration filter being based on a transfer function of an image pickup system that is used to form an object image as the input image, wherein the image restoration filter performs restoration so that when an object is a white point light source, a difference between spectra of two color components in the restored image is made smaller than a difference between spectra of the two color components in the input image.

Further features of the present invention will become apparent from the following description of exemplary embodiments with reference to the attached drawings).

BRIEF DESCRIPTION OF DRAWINGS

FIG. 9 is a diagram explaining an edge enhancement filter.

DESCRIPTION OF EMBODIMENTS

Prior to the description of specific exemplary embodiments, first, a description will be given of an overview of an image processing flow of the present invention with reference to FIG. 1.

First, in an image acquisition step in step S11, an input image is acquired. Then, in step S12, image pickup conditions of the input image acquired in step S11 are acquired. Then, in step 13, an image restoration filter corresponding to the image pickup conditions is selected from a memory. If the image pickup conditions are different from image pickup conditions prepared in advance in the memory, the image pickup conditions can also be appropriately corrected and used. Then, in an image restoration processing step in step S14, an image restoration process is executed using the image restoration filter in step S13. Then, a corrected image corrected in step S14 is output as an output image. The image restoration filter used in step S13 is generated on the basis of the optical transfer function (OTF) of an image pickup optical system (image pickup system) and a chromatic aberration correction coefficient.

Figure 1:
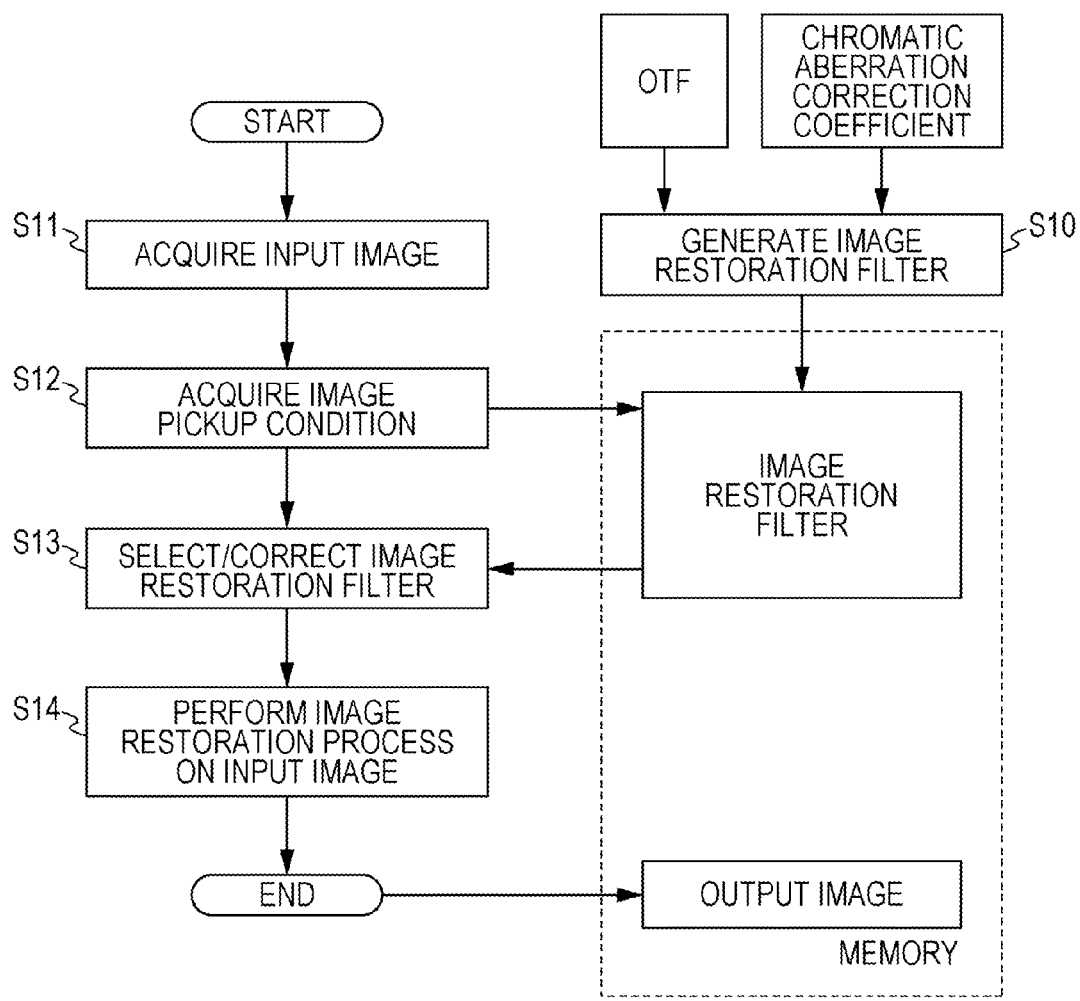
FIG. 1 is a diagram explaining an image restoration process.

Note that electronic aberration correction such as correction of chromatic aberration of magnification, correction of distortion aberration, and amount-of-ambient-light correction and processes such as demosaicing, gamma conversion, and image compression may be inserted before, after, or in the middle of the processes in FIG. 1. Then, each of the processes illustrated in FIG. 1 will be described in more detail.

(Image Acquisition Step)

An image acquired in the image acquisition step in step S11 (hereinafter, input image) is a digital image obtained by picking up an image using an image pickup element via an image pickup optical system, and has been degraded by an optical transfer function (OTF) caused by the aberration of an image pickup system including a lens and various optical filters. In addition to the lens, the image pickup optical system can also include a mirror (reflection surface) having a curvature.

Further, the input image is represented by a color space. Examples of the representation of color space include RGB, and, besides RGB, LCH representing lightness, hue, and chroma, and YCbCr representing luminance and color difference signal. Other color spaces are XYZ, Lab, Yuv, JCh, and color temperature. A value represented by any of the above generally available color spaces can be used as a color component in the present invention.

The input image may also be a mosaic image with pixels each having the signal value of one color component, or a demosaiced image with pixels each having the signal values of a plurality of color components, which is obtained by performing a color interpolation process (demosaicing process) on the mosaic image. A mosaic image is an image obtained before image processing is performed, such as a color interpolation process (demosaicing process), gamma conversion, or image compression based on JPEG or the like, and is also called a RAW image. For example, if information on a plurality of color components is obtained using a single-plate image pickup element, each pixel is provided with a color filter having a different spectral transmittance to acquire a mosaic image with pixels each having the signal value of one color component. Through a color interpolation process performed on the mosaic image, an image with pixels each having the signal values of a plurality of color components can be acquired. Further, if a multi-plate, for example, three-plate, image pickup element is used, each image pickup element is provided with a color filter having a different spectral transmittance to acquire a demosaiced image having image signal values of color components that differ from one image pickup element to another. In this case, each image pickup element has the signal value of an individual color component for a corresponding pixel. Thus, an image with pixels each having the signal values of a plurality of color components can be acquired without specially performing a color interpolation process.

Furthermore, the input image can accompany various correction information for correcting the input image. The correction information includes information regarding the image pickup conditions (image pickup condition information) such as the lens focal length (zoom position), aperture value, photographing distance (focus distance), exposure time, and ISO sensitivity. If a series of processes from picking up an image to outputting an image is performed using a single image pickup apparatus, image pickup condition information or correction information can be acquired within the apparatus even if it is not accompanied by the input image. However, if a RAW image is acquired from an image pickup apparatus and an image processing apparatus different from the image pickup apparatus performs an image restoration process, a development process, and the like, as described above, it is preferable that the correction information be accompanied by the image. However, this is not exhaustive, and a system in which the image processing apparatus stores correction information in advance so that correction information can be selected from image pickup condition information accompanied by an input image would not necessarily need to accompany an image with correction information.

While the input image has been described as a digital image obtained by picking up an image using an image pickup element via an image pickup optical system, the input image may also be a digital image obtained by an image pickup system that does not include an image pickup optical system. For example, an image obtained by an image pickup apparatus that does not have an image pickup optical system like a lens, such as a scanner (reader) or an X-ray image pickup apparatus that picks up an image while making an image pickup element in close contact with an object surface may be used. Images generated by, as above, image sampling based on an image pickup element without using an image pickup optical system are degraded to some extent. In this case, degradation characteristics are not due to the optical transfer function (optical transfer function in narrow sense) of the image pickup optical system but due to the system transfer function of the image pickup system, and this system transfer function may be equivalent to the optical transfer function. Alternatively, a birefringent optical low-pass filter is configured to reduce high-frequency components with respect to the frequency characteristics of the optical transfer function, and the characteristics may be included in the optical transfer function. Furthermore, the pixel aperture shape or the aperture ratio of the image pickup element also have an influence on the frequency characteristics. Other characteristics that can be included in the optical transfer function include the spectral characteristics of a light source and the spectral characteristics of various wavelength filters. It is preferable that an image restoration filter be created on the basis of the optical transfer function in broad sense including the above characteristics. Therefore, the term "optical transfer function", as used in the exemplary embodiments of the present invention, is an optical transfer function in broad sense including a system transfer function of such an image pickup optical system and a system that does not include an image pickup optical system. The system that is the subject of the optical transfer function in broad sense is hereinafter referred to as an image pickup system.

(Image Restoration Filter Generation Step)

Figure 2A:
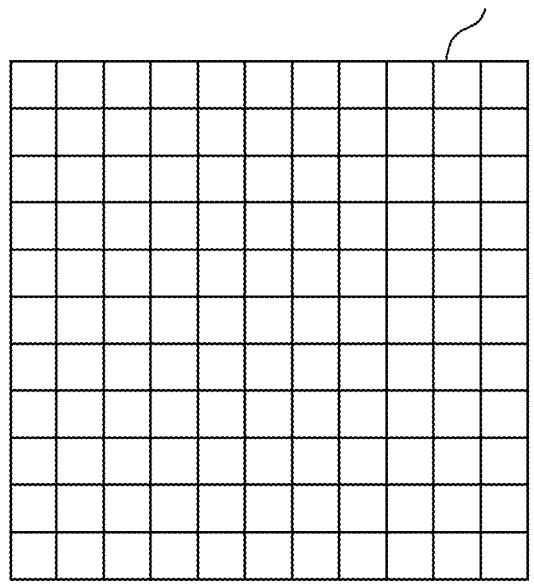
FIG. 2A is a diagram explaining an image restoration filter.
Figure 2B:
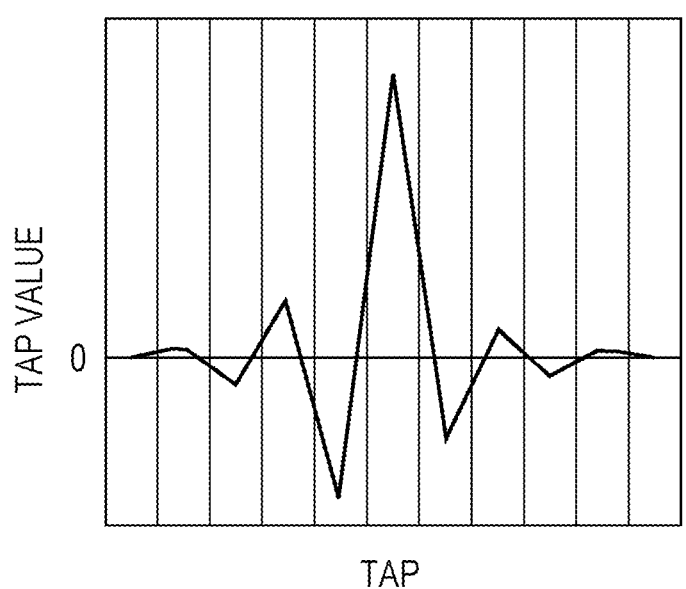
FIG. 2B is a diagram explaining the image restoration filter.

Then, the generation of the image restoration filter used in step S13 will be described with reference to FIGS. 2A and 2B. FIG. 2A is a schematic diagram of an image restoration filter in which a convolution process is performed on pixels of the input image in the real space. The number of taps (cells) of the image restoration filter can be determined in accordance with the aberration characteristics of the image pickup system or the required restoration accuracy. For a two-dimensional image, a two-dimensional image restoration filter having a number of taps corresponding to the respective pixels of the image is generally used. FIG. 2A illustrates a two-dimensional image restoration filter with 11×11 taps, by way of example. In general, furthermore, the larger the number of taps of an image restoration filter, the higher the restoration accuracy. Thus, the number of taps is set in accordance with the required image quality, the image processing performance, the aberration characteristics, and so forth.

The value in each tap is not illustrated in FIG. 2A. One cross section of the image restoration filter is illustrated in FIG. 2B. The distribution of the values (coefficient values) in the respective taps of the image restoration filter fulfill the role to ideally return the spatial spread signal values caused by aberration to the original, one point in the convolution process.

In order to generate the above image restoration filter, first, the optical transfer function of the image pickup system is computed or measured. If the degraded image is an image obtained by an image pickup system that does not have an image pickup optical system, the system transfer function may be used as the optical transfer function.

Then, after the optical transfer function has been acquired, the inverse Fourier transform is applied to the function based on the inverse of the optical transfer function to generate an image restoration filter. The inverse of the optical transfer function (hereinafter abbreviated as OTF) is called an inverse filter.

If a point light source is assumed as an object, the frequency characteristics of an image acquired through the image pickup system are represented by the OTF itself. Therefore, the frequency characteristics of the restored image may be obtained by multiplying the frequency characteristics of the input image (degraded image) by the frequency characteristics of the image restoration filter.

Equation 5 gives an equation representing the frequency characteristics of the image restoration filter. In Equation 5, the frequency characteristics of the restored image are represented by the [rOTF] part.

$$M(u, v) = \frac{1}{H(u, v)}[rOTF] \quad \text{(Equation 5)}$$

Here, M(u, v) represents the frequency characteristics of the image restoration filter, H(u, v) represents the frequency characteristics (OTF) of the input image (degraded image), and [rOTF] represents the restored frequency characteristics of a photographed image of a white point light source. That is, the image restoration filter is generated on the basis of the transfer function (1/H(u, v)) of two color components of the image pickup system and a correction transfer function ([rOTF]) that is corrected so that the difference between the MTFs (absolute values of the OTFs) of the two color components can be reduced. In other words, the image restoration filter in this exemplary embodiment is constructed such that the difference between the absolute values of the transfer functions of the two color components, which are obtained when a restored image is obtained from the object, can be made smaller than the difference between the absolute values of the transfer functions of the two color components of the image pickup system. The MTF is the absolute value (amplitude component) of the transfer function of the image pickup system the (optical transfer function of the image pickup optical system), but can also be regarded as the spectrum of the image if the object is a white point light source.

Further, an image restoration filter configured such that the [rOTF] part in Equation 5 is such that the difference between the color components decreases has a chromatic aberration correction function.

Furthermore, since the amount of phase degradation of the restored image is desirably zero, it is more preferable that rOTF not have the phase component. That is, rOTF is set as a function having only the real part, and is made substantially equal to the MTF. In rOTF, however, the imaginary part may have a value within an allowable range.

With the use of the image restoration filter given in Equation 5, not only a point light source but also any object would be acquired via an image pickup system in which the optical transfer function (OTF) has the rOTF characteristics (restored frequency characteristics of a photographed image of the point light source). Additionally, with the use of OTF (rH(u, v)) common to the color components, an image photographed using an image pickup system having no difference in MTF between the color components can be obtained.

Equation 6 gives an example of the frequency characteristics of a more specific image restoration filter having a chromatic aberration correction function.

$$M(u, v) = \frac{1}{H(u, v)} \frac{|rH(u, v)|^2}{|rH(u, v)|^2 + SNR^2} \quad \text{(Equation 6)}$$

In the image restoration filter M(u, v) having the chromatic aberration correction function given in Equation 6, |rH(u, v)| in the right side is the absolute value (MTF) of the OTF, and therefore the phase component disappears regardless of the value of the parameter SNR that determines the degree of restoration. The PSF can be corrected to a symmetrical shape, and, in addition, image sharpness can also be improved.

Figure 3:
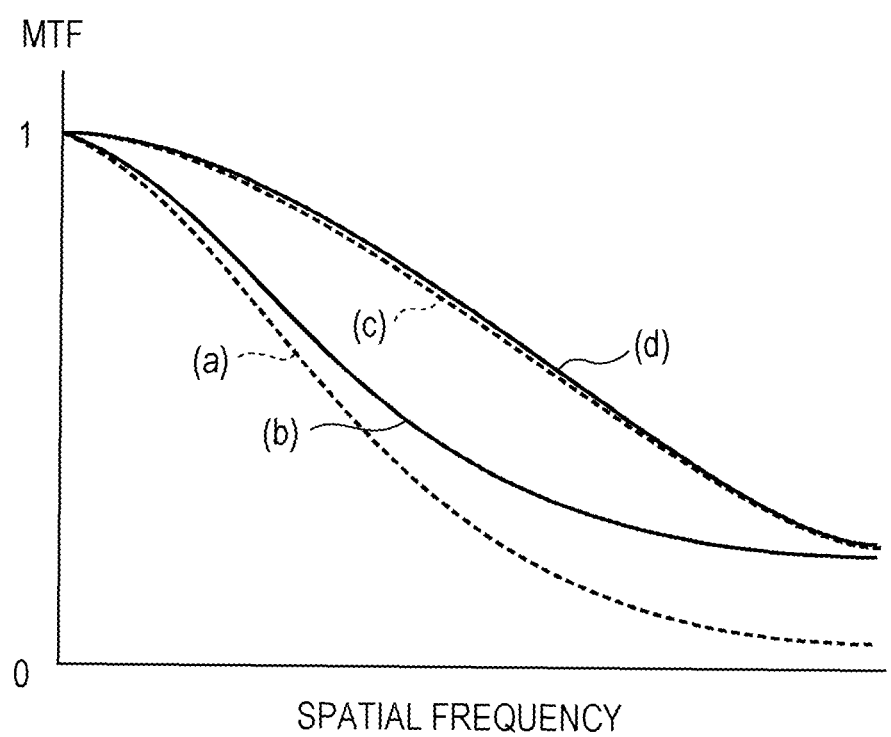
FIG. 3 is a diagram explaining a case where the differences between the MTFs of respective color components are made to match.

The functionality of the image restoration filter given in Equation 6 will be described with reference to FIG. 3. In FIG. 3, the broken line (a) and the solid line (b) indicate the MTFs of a first color component and a second color component, respectively, before restoration, and the broken line (c) and the solid line (d) indicate the MTFs of the first color component and the second color component, respectively, after restoration. As in (a) and (b) in FIG. 3, the MTFs of the image before restoration differ depending on the color component, whereas, as in (c) and (d), the MTFs after restoration match between the color components (the difference decreases).

In other words, the image restoration filter used in the image processing method of this exemplary embodiment performs restoration so that if the object is a white point light source, the difference between the spectra of two color components in the restored image can be made smaller than the difference between the spectra of the two color components in the input image. With the use of this image restoration filter, it is possible to improve (restore) sharpness while reducing chromatic aberration of an image. Here, the difference between spectra is the difference between the frequency averages of the spectra.

Furthermore, rH(u, v) common to the color components is used in Equation 6; however, the amount of correction of chromatic aberration can be controlled by setting rH(u, v) of an image restoration filter for each color component so that the difference between the MTFs of the color components after restoration can be made smaller than the difference between the MTFs before restoration. Equation 7 gives an equation representing the above method.

$$\begin{pmatrix} rH(u, v)_R \\ rH(u, v)_G \\ rH(u, v)_B \end{pmatrix} = \begin{pmatrix} c_{11} & c_{21} & c_{31} \\ c_{12} & c_{22} & c_{32} \\ c_{13} & c_{23} & c_{33} \end{pmatrix} \begin{pmatrix} H(u, v)_R \\ H(u, v)_G \\ H(u, v)_B \end{pmatrix} \quad \text{(Equation 7)}$$

Equation 7 represents a method for correcting rH(u, v) using a chromatic aberration correction coefficient Cnm (n, m=1, 2, 3), and the suffixes R, G, and B represent the respective color components. Equations 8 to 10 represent examples of the chromatic aberration correction coefficient.

$$\begin{pmatrix} c_{11} & c_{21} & c_{31} \\ c_{12} & c_{22} & c_{32} \\ c_{13} & c_{23} & c_{33} \end{pmatrix} = \begin{pmatrix} \frac{1}{3} & \frac{1}{3} & \frac{1}{3} \\ \frac{1}{3} & \frac{1}{3} & \frac{1}{3} \\ \frac{1}{3} & \frac{1}{3} & \frac{1}{3} \end{pmatrix} \quad \text{(Equation 8)}$$

$$\begin{pmatrix} c_{11} & c_{21} & c_{31} \\ c_{12} & c_{22} & c_{32} \\ c_{13} & c_{23} & c_{33} \end{pmatrix} = \begin{pmatrix} \frac{1}{4} & \frac{1}{2} & \frac{1}{4} \\ \frac{1}{4} & \frac{1}{2} & \frac{1}{4} \\ \frac{1}{4} & \frac{1}{2} & \frac{1}{4} \end{pmatrix} \quad \text{(Equation 9)}$$

$$\begin{pmatrix} c_{11} & c_{21} & c_{31} \\ c_{12} & c_{22} & c_{32} \\ c_{13} & c_{23} & c_{33} \end{pmatrix} = \begin{pmatrix} \frac{1}{2} & \frac{1}{4} & \frac{1}{4} \\ \frac{1}{4} & \frac{1}{2} & \frac{1}{4} \\ \frac{1}{4} & \frac{1}{4} & \frac{1}{2} \end{pmatrix} \quad \text{(Equation 10)}$$

In the case of Equation 8, rH(u, v)R, rH(u, v)G, and rH(u, v)B are such that the average value of the MTFs of the respective color components is a value used for the generation of a common image restoration filter.

In the case of Equation 9, rH(u, v)R, rH(u, v)G, and rH(u, v)B are such that a value obtained by combining (summing) the G component, the R component, and the B component in the ratio of 50%, 25%, and 25% is a value used for the generation of a common image restoration filter.

In the case of Equation 10, a value obtained by combining (summing) the subject color component and the other two color components in the ratio of 50%, 25%, and 25% is a value used for the generation of an image restoration filter for each color component. In Equation 10, the value of rH(u, v) differs from one color component to another. However, because of the mixture with other color components, chromatic aberration can be reduced.

Figure 4:
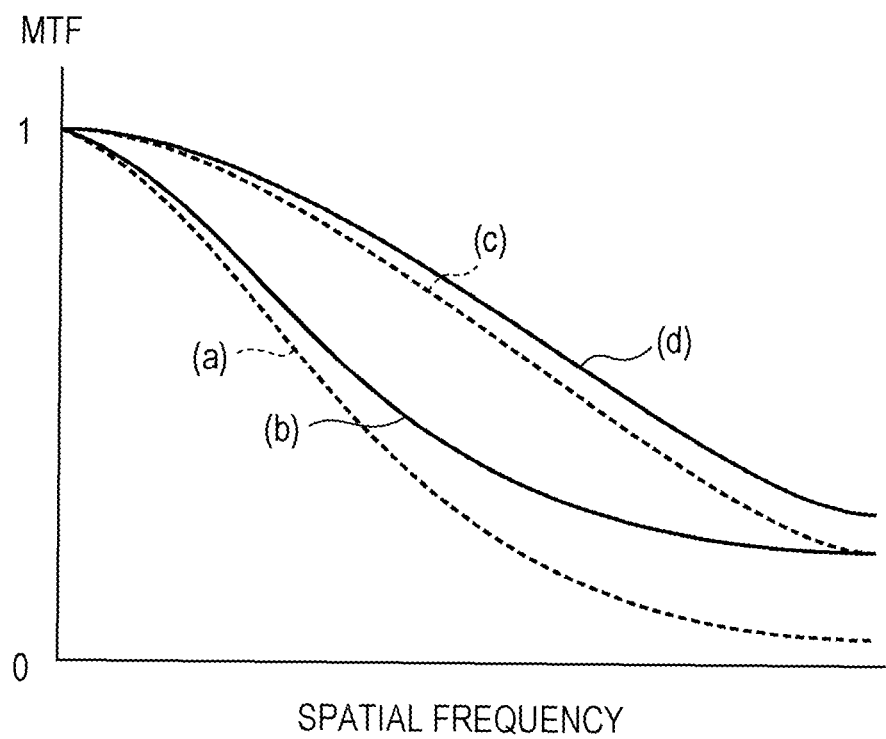
FIG. 4 is a diagram explaining a case where the differences between the MTFs of respective color components are reduced.

The changes in the MTFs before restoration and after restoration when, as given in Equation 10, rH(u, v)R, rH(u, v)G, and rH(u, v)B are different are illustrated in FIG. 4. In FIG. 4, the broken line (a) and the solid line (b) indicate the MTFs of a first color component and a second color component, respectively, before restoration, and the broken line (c) and the solid line (d) indicate the MTFs of the first color component and the second color component, respectively, after restoration. Although, as in the solid line (c) and the broken line (d) in FIG. 3, the MTFs do not match, the difference between the MTFs of the color components is smaller than that before restoration indicated by the broken line (a) and the solid line (b) in FIG. 4, and chromatic aberration can be reduced. More preferably, correction is performed so that the frequency average representative of the difference between the MTFs of the first color component and the second color component after restoration can be made ½ or less the frequency average representative of the difference between the MTFs of the first color component and the second color component before restoration. In the case of FIG. 4, preferably, the frequency average representative of the difference between (c) and (d) is made ½ the frequency average representative of the difference between (a) and (b). The frequency range within which the frequency average is computed is set to the Nyquist frequency range of a sensor.

That is, restoration is performed using the image restoration filter so that the difference between the MTFs of two color components of the image pickup system can be reduced. Therefore, chromatic aberration can be reduced, and an image with satisfactory quality can be obtained.

In addition, if the input image is composed of RGB color components, an image restoration filter that reduces the difference between the MTF of a high-relative-luminosity color component (for example, G or R) and the MTF of another color component (for example, B) can reduce visual color fringing.

Since the H(u, v) part of the image restoration filter given in Equation 6 differs from one color component to another, even if rH(u, v) is common to the color components, the image restoration filter has different characteristics for each color component.

The image restoration filter of the present invention can also be modified in a manner other than Equation 5. The right side of Equation 5 is composed of 1/H(u, v) and rOTF, and the rOTF part may be common to the color components.

(Image Restoration Processing Step)

Next, a method for obtaining a restored image in step S14 using a generated image restoration filter will be described.

As described previously, in the image restoration step, a degraded image is convoluted with an image restoration filter to obtain a restored image. Here, a convolution (convolution integral, sum of products) process is performed on each of pixels included in the taps of the image restoration filter. Convolution is a process in which in order to improve the signal value of a certain pixel, the pixel is made to match the center of the image restoration filter. Then, the product of the signal value of the image and the coefficient value of the image restoration filter is determined for each corresponding pixel of the image and the image restoration filter, and the total sum of the products is replaced by the signal value of the center pixel.

The advantage of applying the image restoration filter to or performing a convolution process on an input image is to restore an image without using the Fourier transform or the inverse Fourier transform of the image in the image restoration process. In general, the load of the convolution process is less than the load of the Fourier transform. Therefore, an image restoration process can be performed with reduced processing load.

The number of vertical and horizontal taps of the image restoration filter has been previously described. However, the number of vertical taps and the number of horizontal taps may not necessarily be the same, and can be arbitrarily changed with care when a convolution process is performed.

In addition, in the image restoration process of the present invention, because the reverse step for restoring to the original image that has not been degraded can be performed more accurately if the image degradation step is linear, it is preferable that adaptive nonlinear processes have not been performed on the input image. That is, it is more preferable that the image restoration process be performed on a mosaic image (RAW image). However, the image restoration process of the present invention can be applied regardless of whether the input image is a mosaic image or a demosaiced image. The reason is that if the degradation step based on the color interpolation process is linear, the image restoration process can be performed by taking into account the degradation function during the generation of an image restoration filter. Further, if the required restoration accuracy is low or if only an image that has been subjected to various image processing operations is available, the effect of reduced chromatic aberration can be achieved even if the image restoration process is performed on a demosaiced image.

(Image Output Step)

The restored image acquired through the above processes is output to the desired device as an output image. If an image pickup apparatus is available, the image is output to a display unit, a recording medium, or the like. If an image that has been subjected to an image restoration process undergoes other image processing operations or the like, the image may be output to a device that executes the subsequent steps.

While the image processing of the present invention has been described step-by-step in sequence, the respective steps can be processed collectively if some steps can be processed at the same time. A necessary processing step can also be added as appropriate before or after each step. Moreover, the equations or equal signs used in the foregoing description are not intended to limit a specific algorithm of the image processing of the present invention, and can be modified as necessary as long as the object can be achieved.

Exemplary embodiments using the image processing described above will be described hereinafter.

Exemplary Embodiment 1

Figure 5:
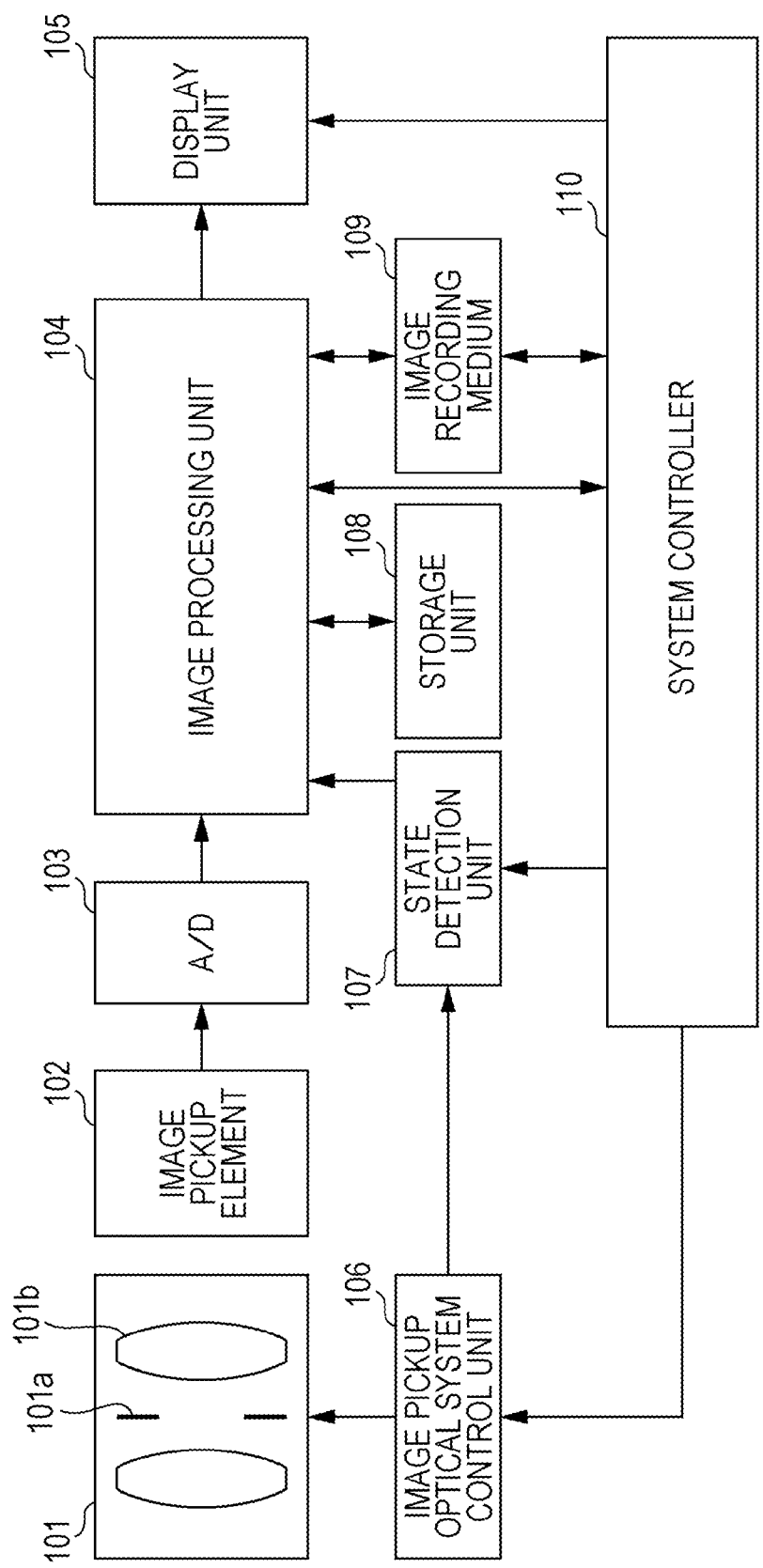
FIG. 5 is a block diagram illustrating the configuration of an image pickup apparatus including an image processing apparatus.

FIG. 5 is a schematic diagram of the configuration of an image pickup apparatus in Exemplary Embodiment 1. An object image (not illustrated) is formed onto an image pickup element 102 using an image pickup optical system 101. The image pickup element 102 converts (photoelectrically converts) the light of the formed image into an electrical signal, and an A/D converter 103 converts the electrical signal into a digital signal. Then, an image processing unit 104 performs image processing on the digital signal (input image) together with a certain process. Examples of the certain process here include electronic aberration correction such as correction of chromatic aberration of magnification, distortion aberration correction, and amount-of-ambient-light correction and processes such as demosaicing, gamma conversion, and image compression.

First, the image processing unit 104 obtains information on the image pickup conditions (image pickup state) of the image pickup apparatus from a state detection unit 107. The state detection unit 107 may obtain information on the image pickup conditions directly from a system controller 110, or may obtain, for example, image pickup condition information regarding the image pickup optical system 101 from an image pickup optical system control unit 106. Then, the image processing unit 104 selects an image restoration filter corresponding to the image pickup conditions from a storage unit 108, and performs an image restoration process on an image input to the image processing unit 104. As the image restoration filter, an image restoration filter selected from the storage unit 108 in accordance with the image pickup state may be used as it is, or an image restoration filter obtained by correcting an image restoration filter prepared in advance so as to be more suitable for the image pickup state may be used.

Then, an output image processed by the image processing unit 104 is stored in an image recording medium 109 in a certain format. The output image is an image with corrected chromatic aberration and improved sharpness. Further, an image obtained by performing a certain process (correction process) for display on the image obtained after the image restoration process may be displayed on a display unit 105, or, for high-speed display, an image obtained without performing a correction process or an image obtained by performing a simple correction process may be displayed on the display unit 105.

The series of control operations described above is performed by the system controller 110, and the image pickup system is mechanically driven by the image pickup optical system control unit 106 in accordance with an instruction of the system controller 110. The aperture diameter of an aperture stop 101a is controlled as photographic condition setting of F-number. For a focus lens 101b, the position of the lens is controlled by using an autofocus (AF) mechanism or a manual focus mechanism (not illustrated) in order to perform focus adjustment in accordance with the photographing distance.

As described earlier, this image pickup system may include optical elements such as a low-pass filter and an infrared cut filter. In a case where an element having an influence on the characteristics of the OTF, such as a low-pass filter, is used, the influence of this element is taken into account at the time when an image restoration filter is created. Thus, the restoration process can be more accurately performed. An infrared cut filter also has an influence on the point spread function (PSF) of each of the RGB channels, which is the integral value of the PSFs of the spectral wavelengths, particularly, on the PSF of the R channel. Thus, it is more preferable that the influence be taken into account at the time when an image restoration filter is created.

Further, the image pickup optical system 101 is constructed as a portion of an image pickup apparatus. However, the image pickup optical system 101 may be of the replaceable type such as in a single-lens reflex camera. Functions such as the control of the aperture diameter of the aperture stop and manual focusing may not necessarily be used in accordance with the purpose of the image pickup apparatus.

Further, since the OTF changes in accordance with the image height (position of the image) of the image pickup system even under a single image pickup condition, it is preferable that the image restoration process of the present invention be performed in accordance with the image height by changing the image restoration filter.

Further, the image processing unit 104 at least includes a calculation unit and a temporary storage unit (buffer). An image is temporarily written to (stored in) and read from the storage unit as necessary in each step of the image processing described above. Further, the storage unit used for temporary storage is not limited to the temporary storage unit (buffer) described above, and may also be the storage unit 108. Any suitable one may be selected as appropriate in accordance with the data capacity or communication speed of a storage unit having the storage function. In addition, the storage unit 108 stores data such as a chromatic aberration correction coefficients, an image restoration filter, and correction information.

Figure 6:
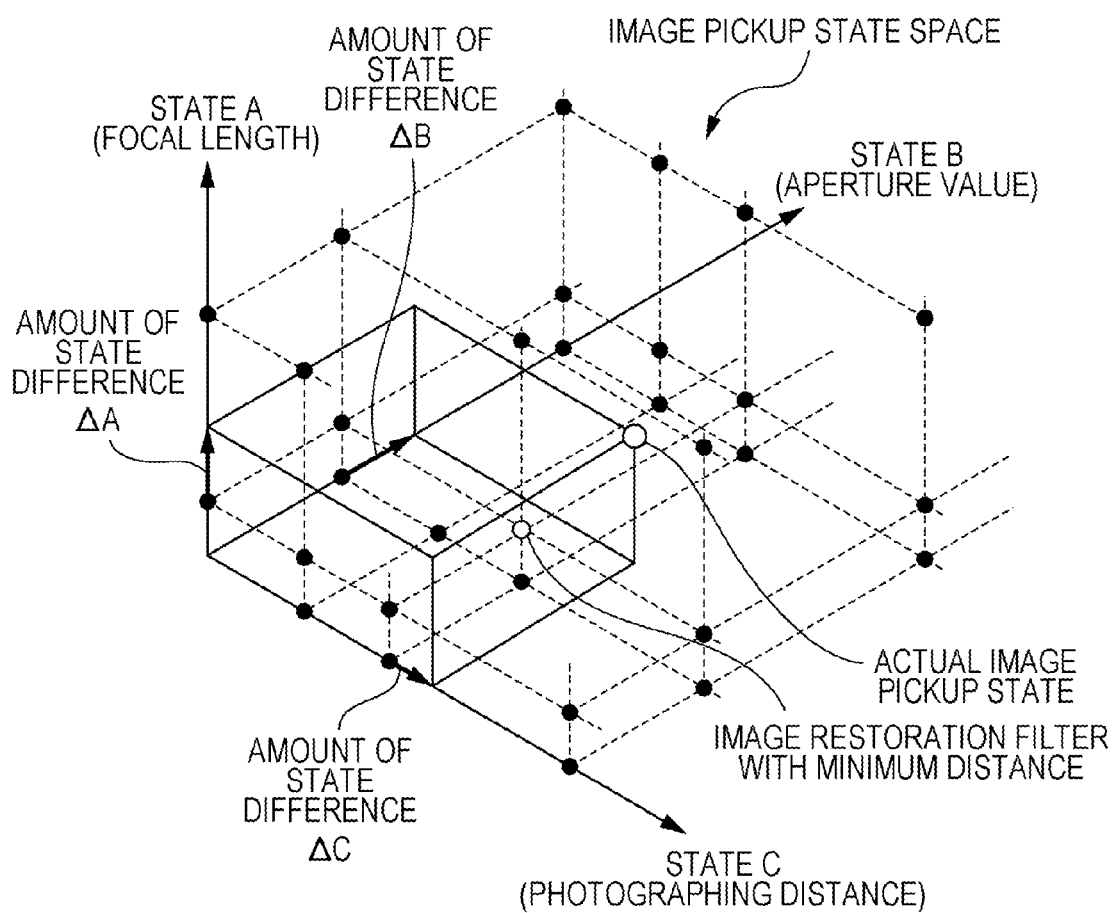
FIG. 6 is a diagram explaining selection and correction of an image restoration filter.

The selection and correction of an image restoration filter will be described with reference to FIG. 6. FIG. 6 schematically illustrates a conceptual diagram explaining image pickup condition information (image pickup condition information) and a plurality of image restoration filters (black circles) stored in the storage unit 108 in accordance with the image pickup condition information. The image restoration filters stored in the storage unit 108 are arranged in a discrete manner in an image pickup state space having three image pickup states as axes, that is, focal position (state A), aperture value (state B), and object distance (photographing distance) (state C). The coordinates of each point (black circle) in the image pickup state space represent an image restoration filter stored in the storage unit 108. In FIG. 6, the image restoration filters are arranged at grid points along lines perpendicular to the individual image pickup states. However, the image restoration filters may be arranged so as to be located off the grid points. Furthermore, the types of the image pickup states are not limited to the focal length, aperture value, and object distance, and the number of states may not necessarily be three. A forth- or higher-order dimensional image pickup state space based on four or more image pickup states may be constructed, and the image restoration filters may be arranged in the image pickup state space in a discrete manner.

In FIG. 6, it is assumed that the image pickup state indicated by the larger white circle is an actual image pickup state detected by the state detection unit 107. If an image restoration filter stored in advance is located at or near the position corresponding to the position of the actual image pickup state, the image restoration filter may be selected and used in the image restoration process. One method for selecting an image restoration filter near the position corresponding to the actual image pickup state is a method of calculating the distance (the amount of difference in image pickup state) in the image pickup state space between the actual image pickup state and each of a plurality of image pickup states at which the image restoration filters are stored, and then selecting the image restoration filter at the shortest distance position. Through the above method, the image restoration filter at the position indicated by the smaller white circle in FIG. 6 is selected.

Other methods include a method of selecting an image restoration filter with weights based on directions in the image pickup state space, that is, a method of selecting the image restoration filter having the highest value of the evaluation function, where the evaluation function is the product of a distance in the image pickup state space and a weighted direction.

Next, a method for generating a new image restoration filter by correcting a selected image restoration filter will be described. In order to correct an image restoration filter, first, the distance (amount of state difference) in the image pickup state space between the actual image pickup state and each of the image pickup states at which the image restoration filters are stored is calculated, and the image restoration filter at the shortest distance (smallest amount of state difference) position is selected. With the selection of the image restoration filter having the smallest amount of state difference, the amount of correction of the image restoration filter can be reduced, and an image restoration filter close to the desired image restoration filter under the image pickup state can be generated.

In FIG. 6, the image restoration filter at the position indicated by the smaller white circle is selected. The amounts of state difference AA, AB, and AC between the image pickup states corresponding to the selected image restoration filter and the actual image pickup state are calculated. State correction coefficients are calculated on the basis of the amounts of state difference, and the selected image restoration filter is corrected using the state correction coefficients. Accordingly, the image restoration filter corresponding to the actual image pickup state can be generated.

As another method, a plurality of image restoration filters located near the actual image pickup state are selected and an interpolation process is performed in accordance with the amount of state difference between each of the plurality of image restoration filters and the actual image pickup state. Thus, an image restoration filter suitable for the image pickup state can be generated. Here, the interpolation process may be interpolation based on linear interpolation of the coefficient values of corresponding taps of two-dimensional image restoration filters, polynomial interpolation, spline interpolation, and so forth.

Further, the OTF used for the generation of an image restoration filter can be determined by computation using an optical design tool or an optical analysis tool. Furthermore, the OTF in the actual state of the image pickup optical system alone or the image pickup apparatus can also be determined by measurement.

Figure 7:
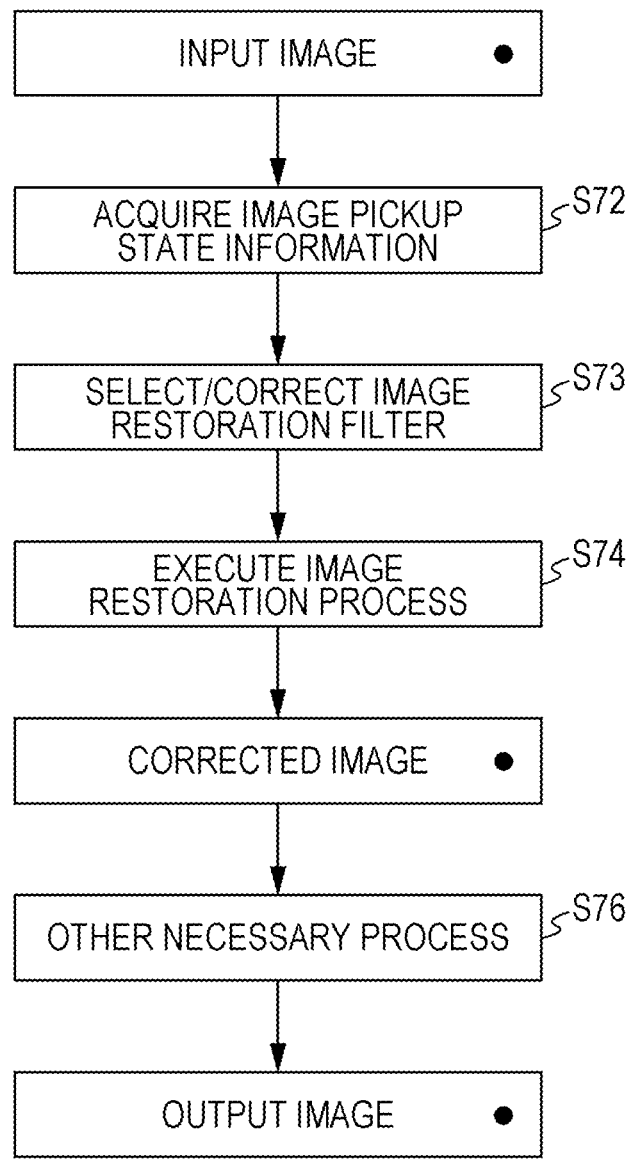
FIG. 7 is a flowchart of image processing in Exemplary Embodiment 1.

FIG. 7 illustrates a flowchart of the image restoration process in Exemplary Embodiment 1, which is executed by the image processing unit 104. In FIG. 7, the black dot mark indicates a step in which pixel data such as image data is at least temporarily stored.

The image processing unit 104 acquires an input image in the image acquisition step. Then, the image processing unit 104 obtains image pickup condition information from the state detection unit 107 (step S72). Then, the image processing unit 104 selects an image restoration filter in accordance with the image pickup state from the storage unit 108 (step S73), and outputs a restored image obtained by performing a restoration process on the input image using the image restoration filter in the image restoration processing step (step S74).

Then, the image processing unit 104 performs other processes necessary for image formation, and outputs a restored image (step S76). Here, the other processes include color interpolation process (demosaicing process), shading correction (amount-of-ambient-light correction), and distortion aberration correction if the restored image is a mosaic image. Various image processing operations including the other processes described here can be inserted as necessary before, after, or in the middle of the flow described above.

Figure 8:
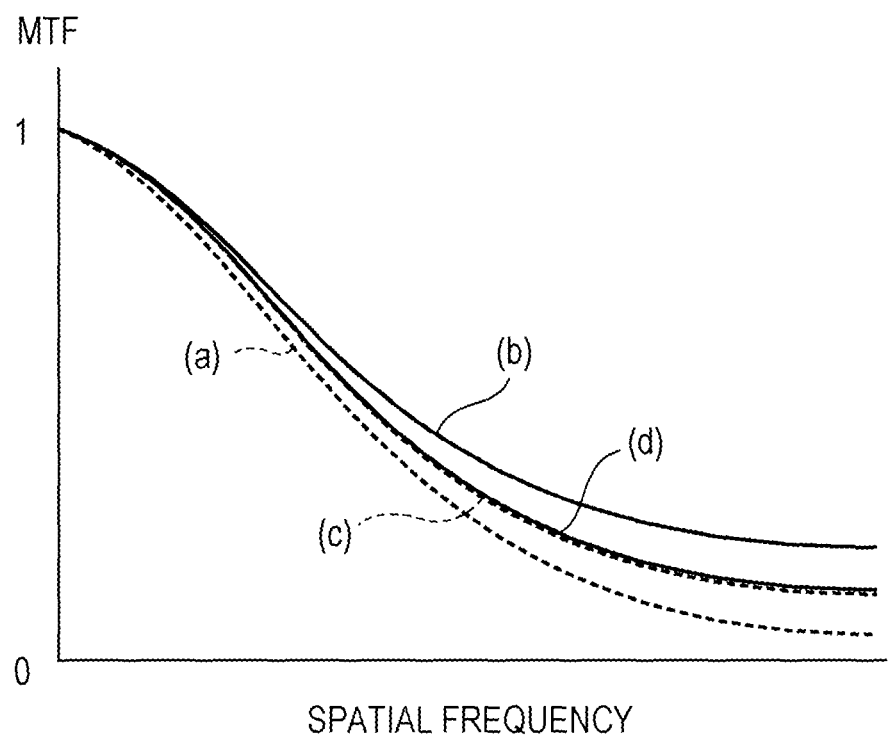
FIG. 8 is a diagram illustrating changes of MTFs before and after image processing.

Here, a more preferred example as a flow of the image restoration process will be described with reference to FIG. 8. FIG. 8 illustrates the changes in MTF before and after the restoration process is performed. The broken line (a) and the solid line (b) indicate the MTFs of a first color component and a second color component, respectively, before the image restoration process is performed, and the broken line (c) and the solid line (d) indicate the MTFs of the first color component and the second color component, respectively, after the restoration process has been performed. As illustrated in FIG. 8, the image restoration process is performed on the MTFs (a) and (b) of the two color components before restoration with a lower degree of restoration than the degrees of restoration illustrated in FIGS. 3 and 4. This leads to a state where, as in (c) and (d), chromatic aberration has been corrected in a state where the MTFs are not so much improved (the MTFs are low).

The above state is a state where the phase component of aberration and chromatic aberration have been corrected but sharpness is low. An edge enhancement process is performed on such a restored image that has been subjected to a restoration process to improve the sharpness of only the edge portion. Therefore, noise amplification can be reduced more than when the restoration process is performed on the entire image.

That is, an edge enhancement process is performed on a restored image with a low degree of restoration (a small amount of restoration of the MTF), thereby obtaining an image with reduced noise amplification as well as reduced chromatic aberration.

Further preferably, it is preferable that the frequency average of the MTFs of the respective color components after restoration in the image restoration process be less than or equal to 1.5 times the maximum MTF before restoration within the Nyquist frequencies. Through the above processes, an image with satisfactory quality whose chromatic aberration has been reduced while noise amplification has been suppressed can be obtained.

In addition, through an edge enhancement process performed on an image whose phase or chromatic aberration has been corrected, a high-quality, color-fringing-free image with higher symmetry than an image obtained by conventionally performing an edge enhancement process on an image with corrected phase or chromatic aberration can be obtained.

The edge enhancement process will be described with reference to FIG. 9. FIG. 9 illustrates an example of an edge enhancement filter. As illustrated in FIG. 9, a filter for performing edge enhancement can be generated using the difference between a filter that outputs an input image as it is and a differential filter. A Sobel filter that performs first-order differentiation, a Laplacian filter that performs second-order differentiation, and so forth are known as differential filters. The differential filter in FIG. 9 is a Laplacian filter. The edge enhancement filter performs processing based on the relationship between pixel values of adjacent pixels, and therefore, as illustrated in FIG. 9, a filter having approximately 3×3 taps is generally used.

Figure 10A:
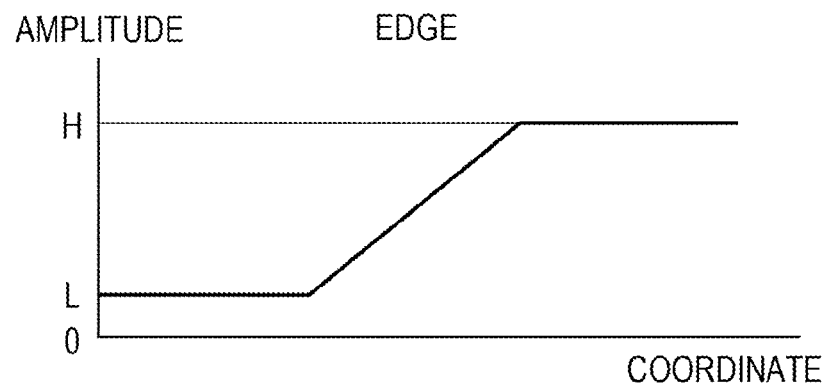
FIG. 10A is an edge cross-sectional view when an edge enhancement filter is used.
Figure 10B:
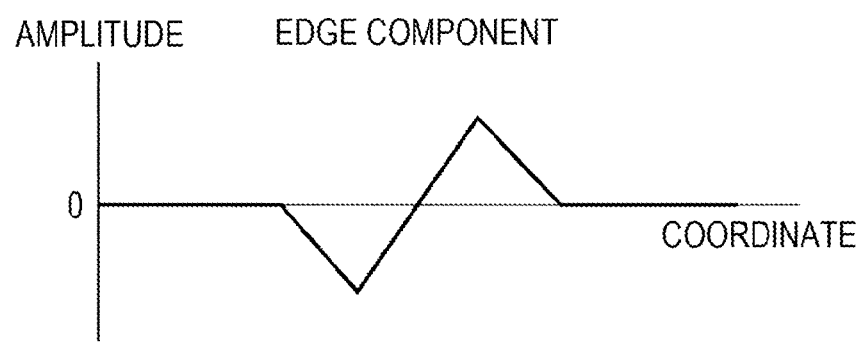
FIG. 10B is an edge cross-sectional view when an edge enhancement filter is used.
Figure 10C:
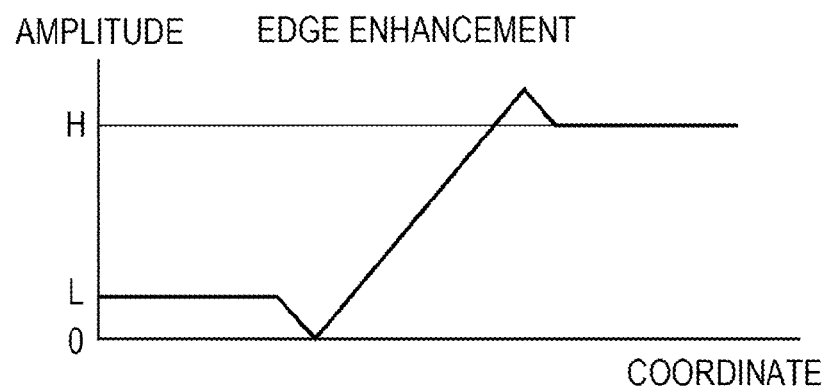
FIG. 10C is an edge cross-sectional view when an edge enhancement filter is used.

FIGS. 10A to 10C illustrate the enhancement effect of an edge portion when the edge enhancement filter illustrated in FIG. 9 is used. FIGS. 10A, 10B, and 10C are diagrams when the luminance of an edge portion in an image is viewed in a certain cross section. The abscissa represents coordinate and the ordinate represents amplitude. FIG. 10A illustrates the luminance cross section of the edge portion in the image, and the FIG. 10B illustrates the edge portion that is extracted by a differential filter and that is sign-inverted. By adding FIG. 10B to the original image FIG. 10A, as in FIG. 10C, the gradient of the edge can be steeply enhanced. The edge enhancement process is particularly applied only to a steep portion of the edge so that the portion can be sharpened, leading to the advantage of the less influence of noise amplification on the entire image. Further, due to the relatively small number of taps of the filter, edge enhancement process also has the advantage of allowing for high-speed processing. Therefore, it is more preferable that an edge enhancement process be performed after an image restoration process is performed with a low degree of restoration. In this manner, in the combination with the edge enhancement process, the other necessary processes in FIG. 7 may include the edge enhancement process. The other processes capable of performing an enhancement process on an edge portion of an image include sharpness processing etc.

Preferred temporal relationship between the individual processing steps and processes to be taken into account have been described. However, those are not exhaustive if the order of the processing steps is constrained from another viewpoint, and may be changed in accordance with the constraint conditions on the processes or the required image quality. Further, while an exemplary embodiment relating to an image pickup apparatus has been illustrated, a variety of modifications and changes can be made within the gist thereof.

Exemplary Embodiment 2

In Exemplary Embodiment 2, an image processing method capable of adjusting the degree to which chromatic aberration appears in a restored image using the image restoration filter described in Exemplary Embodiment 1 will be described.

Figure 11:
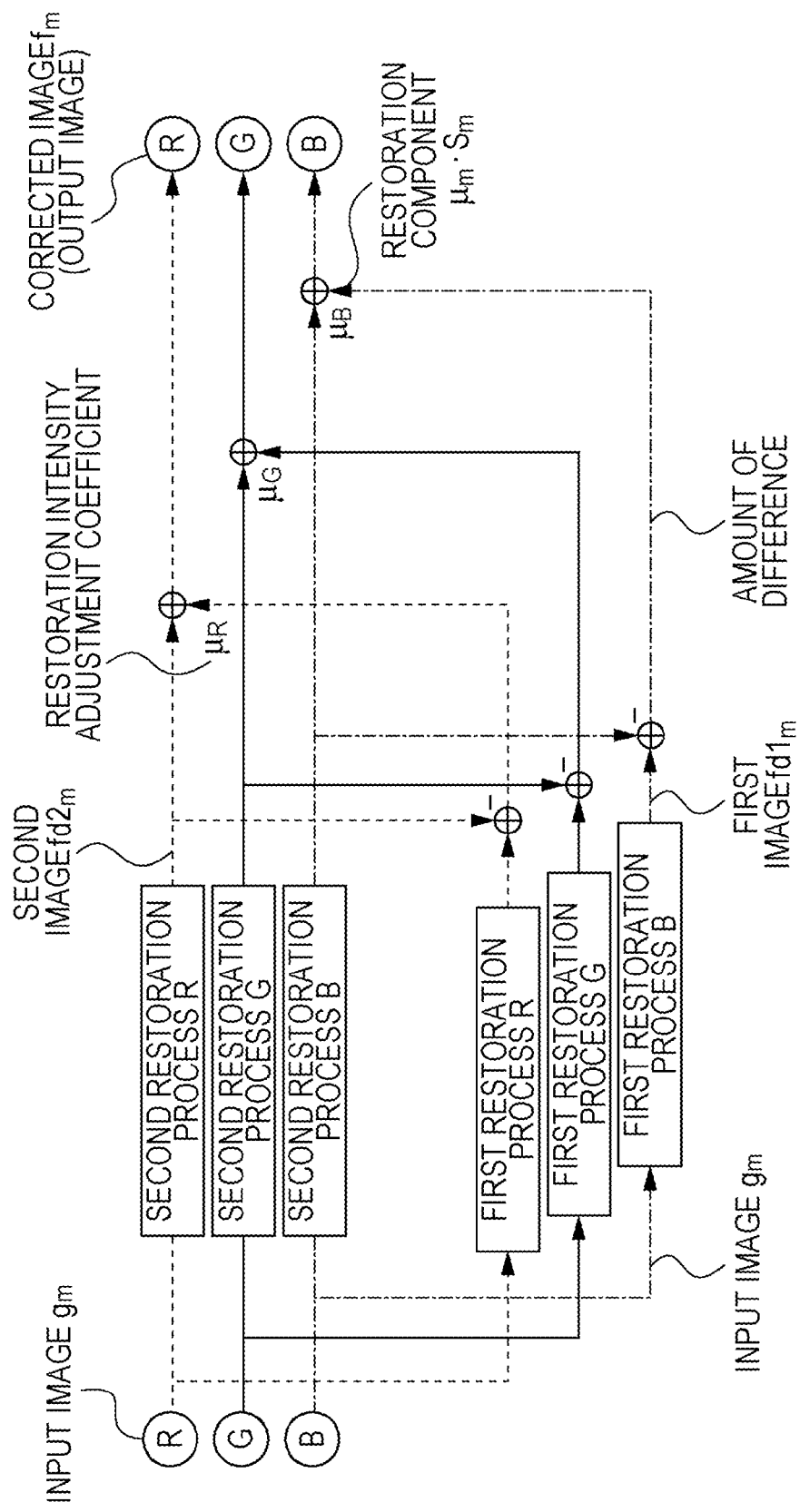
FIG. 11 is a diagram explaining an image processing flow in Exemplary Embodiment 2.

FIG. 11 illustrates a flow of an image processing method executed in Exemplary Embodiment 2. In the following description, symbol m represents a color component (for example, R, G, or B) of an image. That is, Am denotes (AR, AG, AB) representing the R component of A, the G component of A, and the B component of A, respectively. A corresponds to g, f, fd, S, Sd, and so forth in FIG. 11.

An image restoration filter (first image restoration filter) selected or generated for each color component is calculated for an input image $g_m$ having the RGB color components to perform a first restoration process, and a first image $fd1_m$ (first restored image) is obtained.

In the first image $fd1_m$ (first restored image), the phase component of the OTF (optical transfer function) has been corrected and thus sharpness has been improved. Further, correction has been performed so that the MTFs of the individual color components can relatively match each other. Thus, chromatic aberration has been reduced. That is, if the object is a white point light source, the difference between the frequency average of the spectra of the first color component and the frequency average of the spectra in the second color component in the image of the first image $fd1_m$ is smaller than the difference between the frequency average of the spectra of the first color component and the frequency average of the spectra of the second color component in the image obtained before restoration. However, as described above, the first image $fd1_m$ contains noise, false color, or the like.

Meanwhile, an image restoration filter (second image restoration filter) selected or generated for each color component is calculated for the input image $g_m$ to perform a second restoration process, and a second image $fd2_m$ (second restored image) is obtained. In the second image $fd2_m$, the amount of correction of the MTFs is set smaller than for the first image $fd1_m$. In other words, if the object is a white point light source, the frequency average of the spectra of the image of a specific color component in the second image $fd2_m$ is lower than the frequency average of the spectra of the specific color component in the first image $fd1_m$. However, it is more preferable that the second restoration process also be performed to perform restoration so that, as in the first restoration process, the difference between the amplitude components (MTFs) of the OTF of the respective color components can be made smaller than that before restoration.

The second restoration process described above may not necessarily be performed, and the input image may also be used as the second image $fd2_m$.

Subtracting the signal value of the second image $fd2_m$ from the first image $fd1_m$ for each corresponding pixel as in Equation 11 yields restoration component information $S_m$ (difference information) as difference information between the first image $fd1_m$ and the second image $fd2_m$ for each color component.

$$S_m = fd1_m - fd2_m \quad \text{(Equation 11)}$$

Then, as in Equation 12, the restoration component information $S_m$ is combined for each color component with the second image $fd2_m$ in accordance with a restoration strength adjustment coefficient $\mu_m$ to obtain a corrected image $f_m$ serving as a restoration adjustment image (output image).

$$f_m = fd2_m + \mu_m \cdot S_m \quad \text{(Equation 12)}$$

As can be seen from Equation 12, the corrected image $f_m$ is obtained as the second image $fd2_m$ when the restoration strength adjustment coefficient $\mu_m$ is 0, and is obtained as the first image $fd1_m$ when the restoration strength adjustment coefficient $\mu_m$ is 1. Further, when the restoration strength adjustment coefficient $\mu_m$ is in the range from 0 to 1, the degree of restoration is successively adjusted in the range from the second image $fd2_m$ to the first image $fd1_m$.

Here, the degree of restoration can be controlled by adjusting the amount of calculation (amount of addition) of the restoration component information $S_m$. The restoration strength adjustment coefficient $\mu$ may be a negative coefficient.

In a conventional method, the recalculation of an image restoration filter and the convolution process of the image restoration filter and the input image are required each time the degree of restoration is changed. According to the image processing method described above, however, the recalculation of an image restoration filter and the re-convolution process of the image restoration filter and an image are not required even if the degree of restoration is changed. Therefore, the image processing load can be reduced. The individual steps in FIG. 11 and images will be described in order hereinafter.

"Input Image $g_m$, Output Image $f_m$"

An input image $g_m$ and an output image $f_m$ can accompany various correction information for correcting an image, including an image pickup state, such as the lens focal length (zoom position), aperture value, and photographing distance (focus distance). Particularly, in this exemplary embodiment, the correction information includes a restoration strength adjustment coefficient μ and a color combination ratio adjustment coefficient ω.

If a series of processes from picking up an image to outputting is performed by a single closed image pickup apparatus, image pickup condition information or correction information can also be acquired within the apparatus even if it is not accompanied by the image. If a RAW image is acquired from an image pickup apparatus and another image processing apparatus performs a correction process or a development process, as described above, it is preferable to accompany image pickup condition information or correction information with an image.

However, a system in which correction information is stored in advance on the image processing apparatus side so that a correction coefficient can be selected from image pickup condition information would not necessarily need to accompany correction information with an image. As for the correction information, as described above, a correction coefficient can be obtained as an initial value, or a user can also change the correction coefficient value. A user changes the correction coefficient while evaluating an output image using a monitor provided in the image pickup apparatus or using a monitor provided as a portion of an image processing system when the image processing apparatus is a separate device from the image pickup apparatus, thereby obtaining the desired output image.

"First Image (First Restored Image) $fd1_m$"

The first image $fd1_m$ is generated by using an image restoration filter that performs restoration so that the difference between the MTFs of the transfer functions of two color components for a system including an image pickup system and the image restoration filter can be made smaller than the difference between the MTFs of the transfer functions of the two color components for the image pickup system. The details of the image restoration filter are those of the image restoration filter described in Exemplary Embodiment 1.

In other words, if the object image is a white point light source that is in focus, the first image $fd1_m$ is obtained through an image restoration process using an image restoration filter that makes the difference between the spectra of two color components in a restored image smaller than the difference between the spectra in the input image. If the first image $fd1_m$ satisfies necessary image quality, the first image $fd1_m$ can be used as the corrected image $f_m$ (restoration adjustment image).

Figure 12:
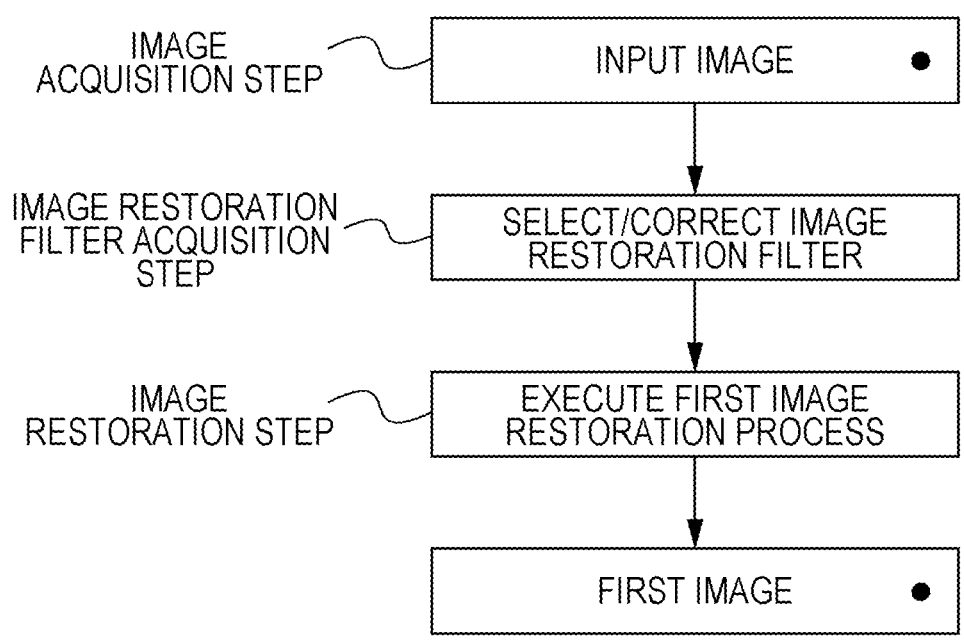
FIG. 12 is flowchart up to an image restoration step.

FIG. 12 illustrates a flow of processing steps from inputting an image to generating the first image $fd1_m$. In FIG. 12, the black dot mark indicates a step in which image data is stored in a storage means such as a memory.

First, an input image is acquired in the image acquisition step. In an image restoration filter acquisition step, an image restoration filter corresponding to the image pickup state of the input image is acquired by selection or correction. The selection or correction of the image restoration filter will be described below. In a following image restoration step, correction is performed using the image restoration filter so that the degraded phase component in the image can be reduced (preferably, to zero) and so that the amplitude component can be improved and the difference between the color components can be reduced (so as to make the amplitude components uniform between the color components). Through the image restoration step, the first image $fd1_m$ is obtained. In other words, if the object image is a white point light source that is in focus, the image restoration filter performs restoration so that the difference between the spectra of two color components in the restored image (first image $fd1_m$) can be smaller than the difference between the spectra of the two color components in the input image.

"Second Image (Second Restored Image) $fd2_m$"

The second image $fd2_m$ is obtained by an image restoration process (second image restoration process) using an image restoration filter that restores only the phase component or using an image restoration filter that restores both the phase component and the amplitude component but that provides the amplitude component with a lower degree restoration than for the first image $fd1_m$.

Preferably, it is more preferable that a restoration process be performed on the second image $fd2_m$ so that, like the first image $fd1_m$, the difference between the amplitude components (MTFs) of the color components can be made smaller than that in the input image or so that the amplitude components (MTFs) can be made relatively match.

More preferably, in the second image $fd2_m$, it is preferable that the phase degradation component be corrected to zero and the amplitude components of the color components are made to match.

If in both the first image $fd1_m$ and the second image $fd2_m$, the difference between the amplitude components of the color components can be reduced by restoration or the amplitude components can be made to match after restoration (if chromatic aberration has been corrected), a corrected image with reduced chromatic aberration can be obtained regardless of whether the degree of restoration is high or low.

Furthermore, the input image can also be used as the second image $fd2_m$. In this case, the input image is obtained as the corrected image $f_m$ (restoration adjustment image) in a state where the degree of restoration becomes minimum. As the degree of restoration increases, the MTFs are improved and sharpness is improved. In addition, the difference between the MTFs of the color components decreases and chromatic aberration is also corrected.

For example, the image restoration filter described with reference to FIG. 8 may be used as an image restoration filter in an image restoration process for obtaining the second image $fd2_m$. With the use of the image restoration filter, chromatic aberration can be corrected by making the MTFs of two color components match. This state is a state where the phase component of aberration and chromatic aberration have been corrected but the sharpness is low (the MTFs are low).

In other words, an image restoration filter that generates the second image $fd2_m$ is generated on the basis of the transfer functions (optical transfer functions) of two color components for the image pickup system (image pickup optical system) and on the basis of the OTF corrected so that the difference between the absolute value components (MTFs) of the transfer functions of the two color components can be reduced. This image restoration filter has a feature of having a lower degree of restoration than an image restoration filter that generates the first image $fd1_m$ (lower MTFs for generating the second image $fd2_m$ than the MTFs for generating the first image $fd1_m$). More restrictively, the frequency average of the MTFs of specific color components in the second restored image is smaller than that in the first restored image. The flow of the processing steps from inputting an image to generating the second image $fd2_m$ is the same as that as illustrated in FIG. 12 up to the generation of the first image.

"Restoration Component Information $S_m$"

Restoration component information $S_m$ (difference information) for each color component can be generated by, as in Equation 11, subtracting the second image $fd2_m$ from the first image $fd1_m$ (performing a subtraction process for each color component and pixel). If correction has been performed so that degraded phase components (phase degradation components) for the image pickup system (image pickup optical system) can be made to match, the states of the phase components of the first image $fd1_m$ and the second image $fd2_m$ are substantially equal but the states of the amplitude components are different. Therefore, the restoration component information $S_m$ can be regarded as the difference information between the amplitude components of the first image $fd1_m$ and the second image $fd2_m$.

Here, preferably, the states of the phase components in both the first image $fd1_m$ and the second image $fd2_m$ are made to match as a state where the phase degradation component due to the image pickup system has been sufficiently removed. On the other hand, the states of the amplitude components need to be different because the degree of restoration can be controlled by the restoration strength adjustment coefficient described below.

Therefore, the restoration component information $S_m$ includes an aberration component other than a phase shift of the second image $fd2_m$, and noise (noise increase component) or ringing components, which have been generated through the image restoration process, and also includes a false color component.

"Restoration Strength Adjustment Coefficient μm and Corrected Image $f_m$"

A restored image on which, as above, a restoration process has been performed using an image restoration filter configured to reduce the difference in chromatic aberration between color components has chromatic aberration reduced. However, the object has generally depth, and a difference between aberration characteristics generated in the actual image pickup state and aberration characteristics expected by the image restoration filter may cause ill effects such as ringing artifact in the restored image.

Furthermore, if the degrees of restoration for two color components are different than expected, color fringing, that is, false color, may occur in a restored image. The false color is also one of artifacts like noise or ringing. False color occurs when color fringing occurs in the edge portion due to manufacturing errors, compared with an image obtained before a restoration process. Alternatively, false color occurs when the luminance saturation caused by the high strength of the sun's reflected rays causes color fringing to occur around the luminance saturation portion, compared with an image obtained before a restoration process. Alternatively, false color occurs when color fringing occurs in the edge portion because of out of focus, compared with an image obtained before a restoration process.

Therefore, a restoration strength adjustment coefficient μ that can adjust the degree of restoration (restoration strength) is used. This makes it possible to control the balance between a risk of causing ill effects involved in image restoration, such as color fringing (false color), noise, or ringing, and the degree of restoration. Even if the aberration characteristics corresponding to the correction characteristics of the image restoration filter are different from the aberration characteristics of the image, satisfactory quality with reduced occurrence of artifacts such as false color and ringing can be obtained. The restoration strength adjustment coefficient μ will be described hereinafter.

As given in Equation 12, the corrected image $f_m$ is obtained by combining, for each color component, the restoration component information $S_m$ with the second image $fd2_m$ in accordance with the restoration strength adjustment coefficient $\mu_m$. The second image $fd2_m$ is obtained as the corrected image $f_m$ when the restoration strength adjustment coefficient μm is 0, and the first image $fd1_m$ is obtained as the corrected image $f_m$ when the restoration strength adjustment coefficient μm is 1. Moreover, since the restoration strength adjustment coefficient $\mu_m$ is adjustable in the range from 0 to 1, the degree of restoration can be continuously adjusted in the range from the second image $fd2_m$ to the first image $fd1_m$.

Both the second image $fd2_m$ and the restoration component information $S_m$ have the phase component and chromatic aberration corrected, and only the amplitude components (amounts of blur) are different. Thus, the phase component and chromatic aberration do not vary even if the amount by which the degree of restoration is to be adjusted (the value of the restoration strength adjustment coefficient μ) is changed. Therefore, sharpness can be adjusted with the chromatic aberration being corrected.

That is, it is possible to correct chromatic aberration and increase sharpness while taking into account any ill effect caused by the image restoration process (false color, ringing, amplified noise). Therefore, a higher-quality image can be obtained.

It is also possible to provide an image having a quality desired by a user while preventing an increase in processing load.

Further, it is also possible to obtain an image that has been corrected with emphasis by setting μ>1 while the fundamental range of the restoration strength adjustment coefficient μ is $0 \leq \mu \leq 1$. That is, the restoration strength adjustment coefficient μ can be variably set.

Furthermore, the restoration strength adjustment coefficient μ is changed for each color component, thus allowing the degree of restoration to be adjusted for each color component. This is effective to adjust the intensity of the degree of restoration for each color component when the optical transfer function (OTF) varies depending on the color component and then the balance of chromatic aberration varies due to the spectral variation of a light source that illuminates the object, manufacturing errors of image pickup optical systems, or the like. Changing the spectral characteristics of an illumination light source is equivalent to changing the intensity ratio for each wavelength. Thus, the amount of aberration changes for each color component. Therefore, a corrected image $f_m$ suitable for each color component can be obtained by setting the restoration strength adjustment coefficient μ for each color component in accordance with the spectral characteristics during photographing.

Further, one of the influences of manufacturing errors of image pickup optical systems may be the difference in the degree of degradation between, for example, right and left symmetrical positions on an image, and the difference in the degree of degradation appears as the difference in blur component on the image or difference in relative color fringing component thereon. For the blur component, the restoration strength adjustment coefficient μ is set in accordance with the changes in the amount of blur at a position on an image, thereby absorbing manufacturing errors. Furthermore, the restoration strength adjustment coefficient is set for each color component in accordance with the changes in the amount of color fringing at a position on an image, thereby absorbing manufacturing errors.

The evaluation of the image quality of an output image differs depending on the purpose. For example, in a portrait, noise and ringing are very obstructive. Meanwhile, when users wish to read a number from a number plate of a vehicle using a monitor camera or the like, the key issue is to specify a number even though noise or ringing is included. Furthermore, if an ill effect such as noise, ringing, or false color largely appears in an image due to some reason, it is important to output an image sufficiently having no ill effect even if the output image has a low degree of restoration in order to ensure that an image is output. The above cases can be addressed by adjusting the restoration strength adjustment coefficient μ.

Moreover, in general photograph shooting, the image quality required for an output image depends upon the user or object, ranging from a soft-focus image with the presence of flare due to the remaining aberration to a sharp image from which the aberration has been removed. Even this case can also be addressed by adjusting the restoration strength adjustment coefficient μ.

Furthermore, Equation 11 may be modified to subtract the first image $fd1_m$ from the second image $fd2_m$ to extract restoration component information. In this case, modifying Equation 11 to subtract (also included in "combining") the restoration component information from the second image $fd2_m$ in accordance with the restoration strength adjustment coefficient yields an equivalent equation, and can achieve the same effect.

In order to change the degree of restoration as described above, conventionally, it is necessary to change a parameter for generating an image restoration filter and therefore it is necessary to recalculate an image restoration filter each time the degree of restoration is changed. It is also necessary to perform a convolution process on an input image using the recalculated image restoration filter. This becomes a big hurdle for high-speed image processing.

In the image processing method in Exemplary Embodiment 2, however, even when the degree of restoration is adjusted, it is only required to change the image combining ratio, and therefore there is no need to recalculate an image restoration filter. Additionally, it is not necessary to perform a convolution process on an input image each time an adjustment parameter is changed. Moreover, even if the degree of restoration is reduced, the asymmetry of aberration is corrected to at least point symmetry. Thus, no variation occurs in a state where the chromatic aberration of magnification has been removed, and the flow of an image, which is a feature of coma aberration, is also corrected.

Figure 13:
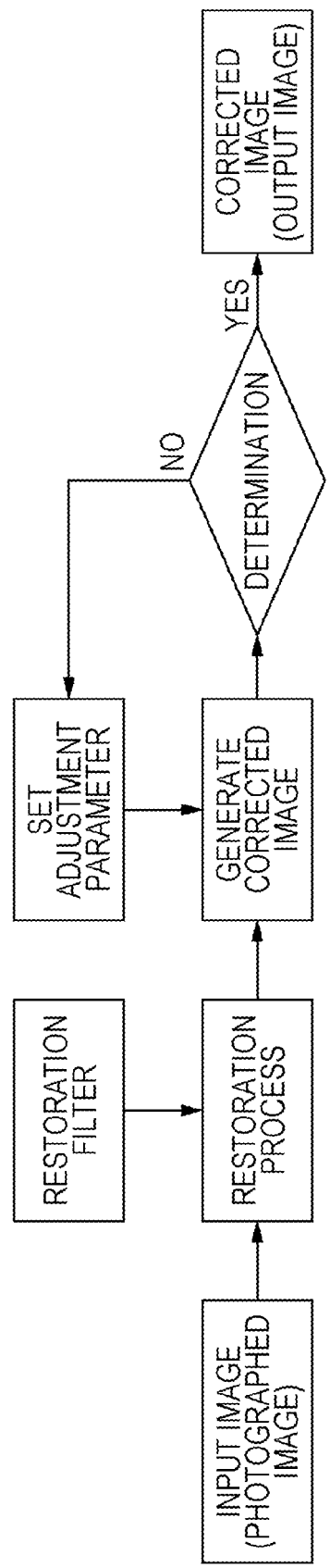
FIG. 13 is a flowchart of the setting of an adjustment parameter.

FIG. 13 is a flow of the image processing method (image restoration process) in this exemplary embodiment, particularly, a flow regarding the setting of an adjustment parameter. A photographed image is used as an input image, and an image restoration filter is generated using a restoration parameter serving as an initial value, or an image restoration process is performed on the input image using an image restoration filter prepared in advance as an initial value. An image combining process is performed on the restored image using one of an adjustment parameter prepared in advance, an adjustment parameter set by a user, and an adjustment parameter automatically determined from image information, and a restoration adjustment image is produced. The restoration adjustment image is evaluated, and it is determined whether the restoration adjustment image is used as an output image as it is or the degree of restoration is to be changed. If the degree of restoration is to be changed, the adjustment parameter is changed, and an image combining process is performed again. The adjustment parameter used herein is the restoration strength adjustment coefficient μ described above.

In this manner, whether or not the recalculation of an image restoration filter during adjustment is required and whether or not the convolution process of the input image and the image restoration filter, which is an image restoration process, is required greatly differ between the conventional image restoration process and the image restoration process in this exemplary embodiment.

Furthermore, the determination as to whether the restoration adjustment image is used as an output image, and the changing of an adjustment parameter in accordance with the change of the degree of restoration may be performed by a user on the basis of the subjective evaluation, or may be performed automatically by setting the evaluation function of the image in advance.

It is also possible to change the adjustment parameter automatically in accordance with the feature values of the pixels in the input image. The term "feature values of the pixels" means partial contrast, luminance level, and the like of the input image. For example, a method that uses a differential filter is known as a method for detecting the level of partial contrast of an image. With the use of this method, it is possible to separate the edge portion in an image from other portions. Since the sharpness of the edge portion has an influence on the sharpness of the entire image, the adjustment parameter is set to increase the degree of restoration for the edge portion. On the other hand, a non-edge portion having a small number of dark and light parts does not have an influence on the sharpness of the entire image even if the degree of restoration increases. Rather, the increase in noise in this portion causes ill effects, and therefore the adjustment parameter is set so that the degree of restoration decreases.

Furthermore, a portion having a low luminance level has a low SN ratio of the original image signal to the noise signal, and the increase in the degree of restoration makes noise more noticeable. Thus, the adjustment parameter is set so that the degree of restoration can be reduced. On the other hand, in a luminance saturation portion, the original image signal is clipped (limited) at the upper limit of the range of the image pickup element, and here, the aberration state is also greatly different than expected. Thus, ill effects caused by image restoration is likely to occur. Therefore, ill effects can be avoided from occurring by setting the adjustment parameter so that the degree of restoration can be reduced.

Additionally, an object may be recognized and the degree of restoration can be adjusted in accordance with the type of the object. As an example, recent digital cameras have a face recognition function. However, if artifact such as noise or false color occurs in the face of a person due to image restoration, the resulting image may be very unnatural. Therefore, it is preferable to appropriately adjust the degree of restoration.

Further, changing the adjustment parameter in accordance with the feature value of a pixel means changing the adjustment parameter in accordance with the position on the image. In this exemplary embodiment, images are combined on a pixel-by-pixel basis in the image combining process. At this time, it is only required to change the mixing ratio to achieve relatively easy adjustment. Such an ability to adjust the degree of restoration on a pixel-by-pixel basis is also a feature of this exemplary embodiment.

The set value of the adjustment parameter can also be changed in accordance with other image pickup states such as the ISO sensitivity, focal length (zoom position), object distance (focus distance), and aperture value.

While a basic flow of the image processing method of the present invention has been described, some of the steps described here may be collectively performed at the same time. Further, a necessary processing step can also be added as appropriate before or after each step. Moreover, the equations or equal signs used in the foregoing description are not intended to limit a specific algorithm of the image processing method of the present invention, and can be modified as necessary.

Figure 14:
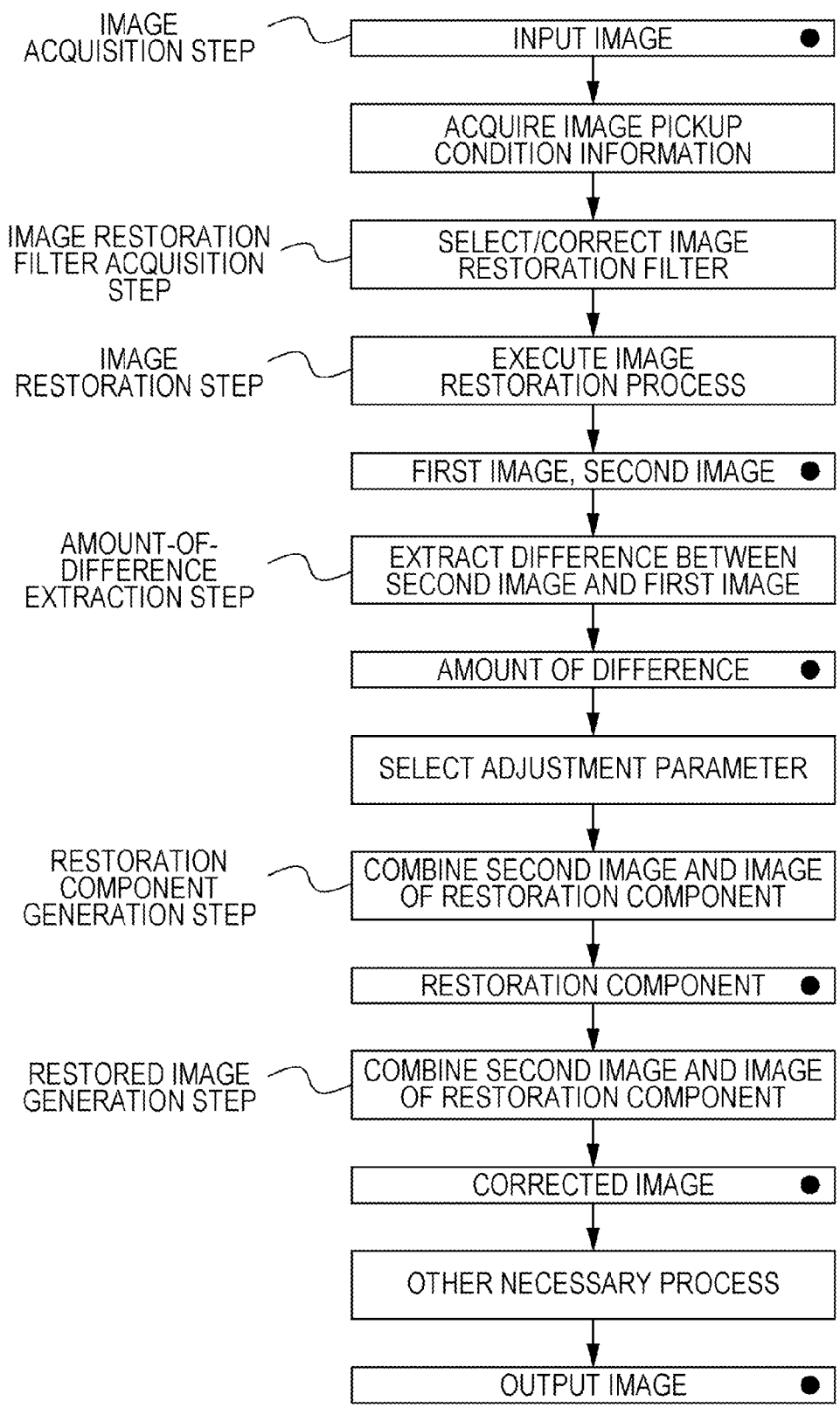
FIG. 14 is a flowchart of entire image processing.

When the image restoration process (image processing method) of this exemplary embodiment is executed by an image pickup apparatus, it is executed by the image processing unit 104 illustrated in FIG. 5. FIG. 14 illustrates a specific flow regarding the image restoration process of this exemplary embodiment, which is executed by the image processing unit 104. In FIG. 14, the black dot mark indicates a step in which pixel data such as image data is at least temporarily stored.

The image processing unit 104 acquires an input image in the image acquisition step (image acquiring step). Then, the image processing unit 104 obtains image pickup condition information from the state detection unit 107, and selects an image restoration filter in accordance with the image pickup state from the storage unit 108. Then, in the image restoration step (image restoring step), the image processing unit 104 performs a restoration process on the input image using the image restoration filter. In the image restoration step, a first image in which the amplitude component and the phase component have been corrected (restored), and a second image in which only the phase component has been corrected (restored) are generated.

In the restoration component information generation step (restoration component information generating step), the image processing unit 104 generates restoration component information from the difference between the signal values of the individual pixels in the first image and the second image. The restoration component information is difference information between the first image and the second image, and therefore has a positive value and a negative value as values.

Then, in the restoration component information generation step (difference information acquisition step), the image processing unit 104 acquires the set value of the adjustment parameter as the restoration strength adjustment coefficient μ. In a method for setting the adjustment parameter, the adjustment parameter can be automatically selected from set values prepared in advance in accordance with the image pickup state or image height, and can be used. Furthermore, the feature values of the pixels are determined from the image and the adjustment parameter can be automatically changed and set. Alternatively, a user can also arbitrarily set the adjustment parameter.

Then, in the restored image generation step (restoration adjustment image generation step), the image processing unit 104 combines the restoration component information with the second image in accordance with the adjustment parameter to generate a corrected image. Specifically, a corrected image is obtained by adding a pixel value, which is obtained by multiplying each pixel value in the restoration component information by the restoration strength adjustment coefficient μ, to the second image for each pixel.

Then, the image processing unit 104 performs other processes necessary for image formation, and outputs a restored image (corrected image). The term "other processes", as used here, is a color interpolation process (demosaicing process) if the image subjected to the correction process is a mosaic image. In addition, an edge enhancement process, shading correction (amount-of-ambient-light correction), distortion aberration correction, or the like may be performed. Furthermore, a variety of image processing operations including the other processes described here can also be inserted as necessary before, after, or in the middle of the flow described above.

While preferred temporal relationship between the individual processing steps and processes to be taken into account have been described, the order of the processing steps is not limited thereto and may be changed in accordance with the constraint conditions on the processes or the required image quality. In this exemplary embodiment, furthermore, a process for restoring only the phase component is performed in the correction process. However, as described above, the amplitude component may be changed to some extent if the noise amplification is within an allowable range.

Further, the image processing unit 104 at least includes a calculation unit and a temporary storage unit (buffer). An image is temporarily written to (stored in) and read from the storage unit as necessary in each step of the image processing described above. The storage unit 108 may be used as the temporary storage unit.

Exemplary Embodiment 3

Figure 15:
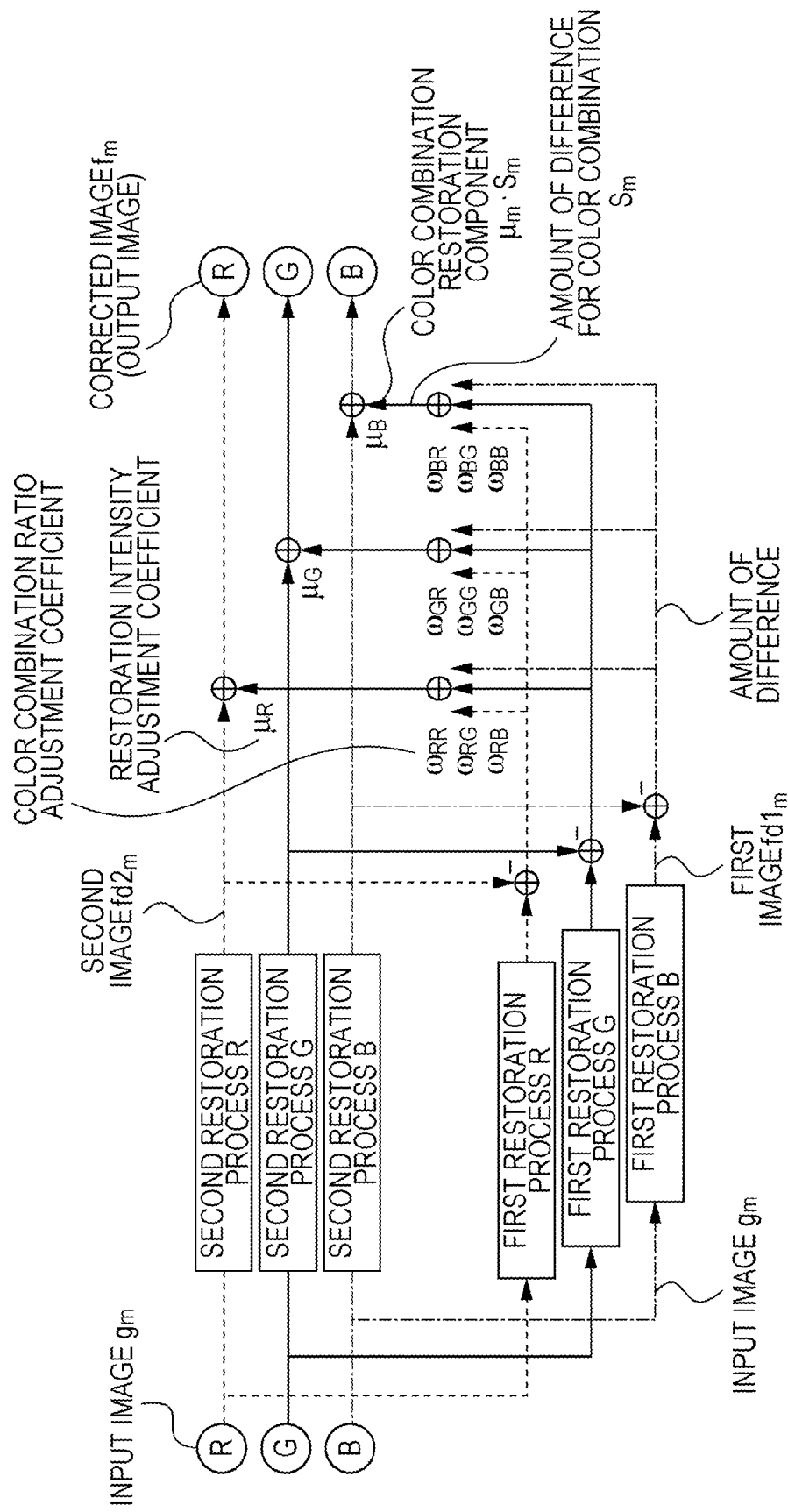
FIG. 15 is a diagram explaining an image processing flow in Exemplary Embodiment 3.

In Exemplary Embodiment 3, an image processing method for reducing the occurrence of false color caused in the image restoration process will be described. FIG. 15 illustrates a flow of a process for generating color combination restoration component information $Sd_m$ for each color component by performing color combination on the restoration component information $S_m$ for each color component in accordance with color combination ratio adjustment coefficient ω, and for combining the color combination restoration component information $Sd_m$ with the second image $S_m$.

The color combination ratio adjustment coefficient ω is a coefficient for generating color combination restoration component information (difference information) $Sd_m$ by performing, for each color component, color combination on restoration component information (amount of difference) $S_m$ for all the color components in accordance with the color combination ratio adjustment coefficient ω, and is the mixing ratio of the color components. Therefore, the process for generating the color combination restoration component information $Sd_m$ from the restoration component information $S_m$ can be expressed as Equation 13 and Equation 14, which is a representation obtained by expanding Equation 13 for the color components m and n.

$$Sd_m = \sum_n^{RGB} \omega_{mn} S_n \quad \text{(Equation 13)}$$

$$\begin{pmatrix} Sd_R \\ Sd_G \\ Sd_B \end{pmatrix} = \begin{pmatrix} \omega_{RR} & \omega_{RG} & \omega_{RB} \\ \omega_{GR} & \omega_{GG} & \omega_{GB} \\ \omega_{BR} & \omega_{BG} & \omega_{BB} \end{pmatrix} \begin{pmatrix} S_R \\ S_G \\ S_B \end{pmatrix} \quad \text{(Equation 14)}$$

Then, a method for determining nine color combination ratio adjustment coefficients ω in Equation 14 will be described. Initially, two examples of color combination ratio adjustment coefficients ω will be described.

The first is a color combination ratio adjustment coefficient ω for obtaining the same image as the first image $fd1_m$ as a corrected image when the restoration strength adjustment coefficient μ is 1. Given a unit matrix in which the elements in the principal diagonal of the color combination ratio adjustment coefficient ω in Equation 14 are 1 and the remaining elements are 0, the color combination restoration component information $Sd_m$ is equal to the restoration component information $S_m$ on the color component itself. This is the setting of a coefficient when the corrected image $f_m$ is output as the same image as the first image $fd1_m$. In this case, as described above, the aberration component is to be maximally corrected as a corrected image, but a risk of generating a false color also increases.

The second is a color combination ratio adjustment coefficient ω for preventing the occurrence of false color. If all the elements of the color combination ratio adjustment coefficient ω in Equation 14 are set to 1/3, the color combination restoration component information $Sd_m$ is equal to the average of the restoration component information $S_m$ on all the color components, and the pieces of color combination restoration component information $Sd_R$, $Sd_G$, and $Sd_B$ are the same. When the color combination restoration component information $Sd_m$ is equal for all the color components, this means no difference in additional information regarding the color components when combining the color combination restoration component information $Sd_m$ with the second image $fd2_m$ in the following step. Thus, no false color occurs.

However, since the aberration information on each color component is averaged, the degree of restoration, that is, sharpness, may be lower than the first, i.e., the case where the first image $fd1_m$ is used as an output image. However, even if the restoration component information $S_m$ is averaged, positive correlation (similarity) is found to some extent between the pieces of restoration component information $S_R$, $S_G$, and $S_B$ on the respective color components. Thus, the sharpness of the corrected image is improved compared with the input image $g_m$. Therefore, this is a restoration condition from which the risk of generating false color has been removed.

The setting of the color combination ratio adjustment coefficient ω when the risk of generating false color is maximized and minimized has been described. The color combination ratio adjustment coefficient ω is successively changed, thereby allowing successive adjustment of the balance between the risk of generating false color and the degree of restoration.

An example of a method for determining an intermediate color combination ratio adjustment coefficient ω in a case other than the case where the color combination ratio adjustment coefficient ω in Equation 14 is a unit matrix and the case where all the elements are 1/3 will be described hereinafter. Since the color combination ratio adjustment coefficient ω has nine degrees of freedom of setting, it may be difficult to set each element value. The color combination ratio adjustment coefficient ω can be variably set, and one example is that, for example, a general user variably sets the color combination ratio adjustment coefficient ω using an image pickup apparatus or an image processing system.

In order to overcome the above difficulty, a dependent relationship is established between the respective elements of the color combination ratio adjustment coefficient ω to reduce the degree of freedom to be controlled. However, the dependent relationship needs to be a relationship capable of adjusting the balance between the degree of restoration and the risk of generating false color. Further, the ability to control a preferred adjustment parameter with a small degree of freedom also allows the provider of an image pickup apparatus or an image processing system to improve the efficiency of work in the apparatus development step or production step.

As an example of a method for determining the color combination ratio adjustment coefficient ω, initially, two constraint conditions are set. The first constraint condition is that, as in Equation 15, the sum of each row of the matrix ω in Equation 14 is set to 1. This means, for example, the normalized mixing ratio of the pieces of restoration component information $S_R$, $S_G$, and $S_B$ for generating the color combination restoration component information $Sd_R$ on the R component. Accordingly, normalizing the mixing ratio makes it easy to compare the weighting rates of different pieces of color combination restoration component information $Sd_m$.

$$\sum_{n}^{RGB} \omega_{mn} = 1 \qquad \text{(Equation 15)}$$

The second constraint condition is that, as in Equation 16, the sum of each row of the matrix ω in Equation 14 is set to 1. This means that when the respective pieces of color combination restoration component information $Sd_R$, $Sd_G$, and $Sd_B$ are generated, the pieces of restoration component information $S_R$, $S_G$, and $S_B$ are distributed to the individual color components and are completely used.

$$\sum_{m}^{RGB} \omega_{mn} = 1 \qquad \text{(Equation 16)}$$

With the provision of the two constraint conditions described above, the color combination ratio adjustment coefficient ω can be expressed as in Equation 17.

$$\omega = \begin{pmatrix} \omega_{RR} & 1 - \omega_{GG} - \omega_{BG} & \omega_{RB} \\ \omega_{GR} & \omega_{GG} & 1 - \omega_{BB} - \omega_{RB} \\ 1 - \omega_{RR} - \omega_{GR} & \omega_{BG} & \omega_{BB} \end{pmatrix} \qquad \text{(Equation 17)}$$

Further, this exemplary embodiment aims at reducing the risk of generating false color while ensuring a certain degree of restoration. Thus, preferably, each piece of color combination restoration component information $Sd_m$ has a high similarity between color components, that is, a smaller difference. The foregoing description for ω=1/3 is based on the state where because of no difference between color components of each piece of color combination restoration component information $Sd_m$, the risk of generating false color is minimum, that is, false color does not occur. Therefore, the restoration component information $S_m$ on a certain color component may be distributed to the pieces of color combination restoration component information $Sd_m$ on the respective color components as evenly as possible. Thus, the smaller the variance of each column of Equation 17, the less the risk of generating false color.

On the basis of the above, minimizing the variance of each column of Equation 17 yields the expression of Equation 18. In Equation 18, a set parameter is one ω, thus making it easy to control the adjustment of the balance between the degree of restoration and the risk of generating false color.

$$\omega = \begin{pmatrix} \omega & (1-\omega)/2 & (1-\omega)/2 \\ (1-\omega)/2 & \omega & (1-\omega)/2 \\ (1-\omega)/2 & (1-\omega)/2 & \omega \end{pmatrix} \qquad \text{(Equation 18)}$$

In Equation 18, if ω=1, the matrix ω is a unit matrix, and the degree of restoration and the risk of generating false color are maximum. Further, if ω=1/3, all the elements of the matrix ω are 1/3, and the degree of restoration decreases while there is no risk of generating false color. Therefore, it is possible to perform adjustment to reduce the risk of generating false color by reducing the color combination ratio adjustment coefficient ω in the range of 1/3≤ω1.

An example of a method for determining the color combination ratio adjustment coefficient ω has been illustrated here. However, the determination method is not limited thereto. For example, if all the elements of the matrix ω are set to 0 (zero), each piece of color combination restoration component information $Sd_m$ is set to 0 (zero) for all the color components. Thus, the corrected image $f_m$ becomes the second image $fd2_m$ itself. In this manner, the color combination ratio adjustment coefficient ω is adjusted within the range of 0≤ω≤1, thus allowing an output image to be adjusted and obtained in the range from the second image $fd2_m$ in which only the phase component has been restored to the first image $fd1_m$ in which the amplitude component and the phase component have been restored. Further, correction can further be emphasized by setting Equation 14 larger than 1.

In this manner, the degree of freedom of setting of each element of the matrix ω is not limited to one, and adjustment may be performed with nine degrees of freedom or any degree of freedom that is reduced on the basis of other constraint conditions. For example, if the setting is based on Equation 16, the degree of freedom is 6.

The range of the color combination ratio adjustment coefficient w can also be set without being limited to 1/3≤ω≤1 as in the case where an input image or enhanced image is obtained as the corrected image $f_m$ described above. That is, Equation 18 is merely an example for easily determining the degree of restoration and a risk of generating false color using a single setting parameter ω. The essence of this exemplary embodiment is that the pieces of restoration component information $S_m$ are combined between color components, and the similarity in color combination restoration component information $Sd_m$ between the color components is controlled to reduce the risk of generating false color.

Furthermore, as in Equation 19, control can also be performed by a combination of the color combination ratio adjustment coefficient ω and the restoration strength adjustment coefficient μ. The combination of them can allow the color combination ratio adjustment coefficient ω to be in the range of 1/3≤ω≤1 to reduce the occurrence of false color, and can allow the restoration strength adjustment coefficient μ to be in the range of 0≤ω1 to control the degree of restoration.

$$f_m = g_m + \mu_m Sd_m \quad \text{(Equation 19)}$$
$$= g_m + \mu_m \sum_n^{RGB} \omega_{mn}(fd_n - g_n)$$

The restoration strength adjustment coefficient may be made common to the respective color components, and may be set as in Equation 20.

$$f_m = g_m + \mu Sd_m \quad \text{(Equation 20)}$$
$$= g_m + \mu \sum_n^{RGB} \omega_{mn}(fd_n - g_n)$$

Furthermore, as described above, when the restoration component information $S_m$ between color components is subjected to color combination, it is necessary to make each pixel have a plurality of pieces of color component information. Therefore, if the image restoration process described above is performed for a mosaic image with pixels each having a single piece of color component information, it is necessary to perform a color interpolation process (demosaicing process) before performing the above color combining process. Thus, a color interpolation process may be performed on the restoration component information $S_m$ of each color component or a color interpolation process may be performed on each of the first image $fd1_m$ and the second image $fd2_m$ to generate restoration component information $S_m$ in which each pixel can have a plurality of pieces of color component information.

As described above, with the use of the color combination ratio adjustment coefficient ω, it is possible to reduce the risk of generating false color, which is caused by the image restoration process, while correcting chromatic aberration. Thus, an image with more satisfactory quality can be obtained. Exemplary Embodiment 4

Figure 16A:
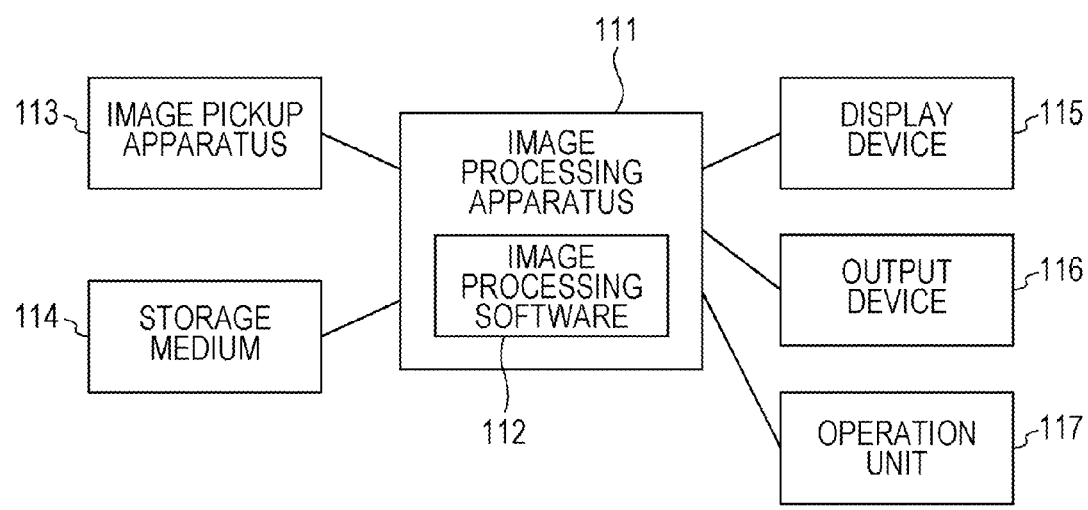
FIG. 16A is a diagram explaining an image processing system.

FIG. 16A illustrates a configuration diagram of an image processing system according to Exemplary Embodiment 2 of the present invention. An image processing apparatus 111 is composed of an information processing apparatus, and has image processing software (image processing program) 112 for causing the information processing apparatus to execute the image processing method described in exemplary embodiments 1 to 3. An image pickup apparatus 113 includes a camera, a microscope, an endoscope, a scanner, etc. A storage medium 114 stores images (photographed image data) generated by image pickup, such as from a semiconductor memory, a hard disk, or a server on a network.

The image processing apparatus 111 acquires image data from the image pickup apparatus 113 or the storage medium 114, and outputs output image (corrected image) data on which certain image processing has been performed to at least one of the output device 116, the image pickup apparatus 113, and the storage medium 114. Furthermore, the output destination may be set to a built-in storage unit of the image processing apparatus 111, and the output image data can also be stored in the storage unit. Examples of the output device 116 include a printer. A display device 115 that is a monitor is connected to the image processing apparatus 111, and a user can perform an image processing work through the display device 115 and can evaluate the restoration adjustment image (output image). The image processing software 112 has, in addition to the image restoration processing function and the degree-of-restoration adjustment function, the development function and any other image processing function as necessary.

Figure 16B:
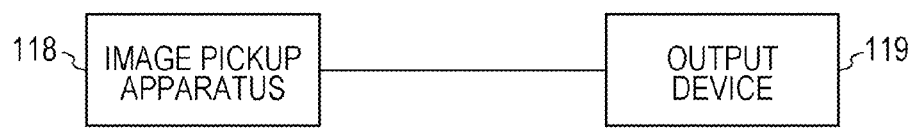
FIG. 16B is a diagram explaining an image processing system.

FIG. 16B illustrates the configuration of another image processing system. As in Exemplary Embodiment 1, if the image pickup apparatus 118 alone performs the image processing in Exemplary Embodiment 1, the image pickup apparatus 118 can output the restoration adjustment image directly to the output device 119.

Furthermore, the output device 119 may be provided with an image processing apparatus that executes the image processing method in Exemplary Embodiment 1, and can therefore set an adjustment coefficient in accordance with the feature value of the image to adjust the degree of restoration. Furthermore, the degree of restoration is adjusted in accordance with the degradation characteristics of the output image of the output device 119, thus making it possible to provide a higher-quality image.

Figure 17:
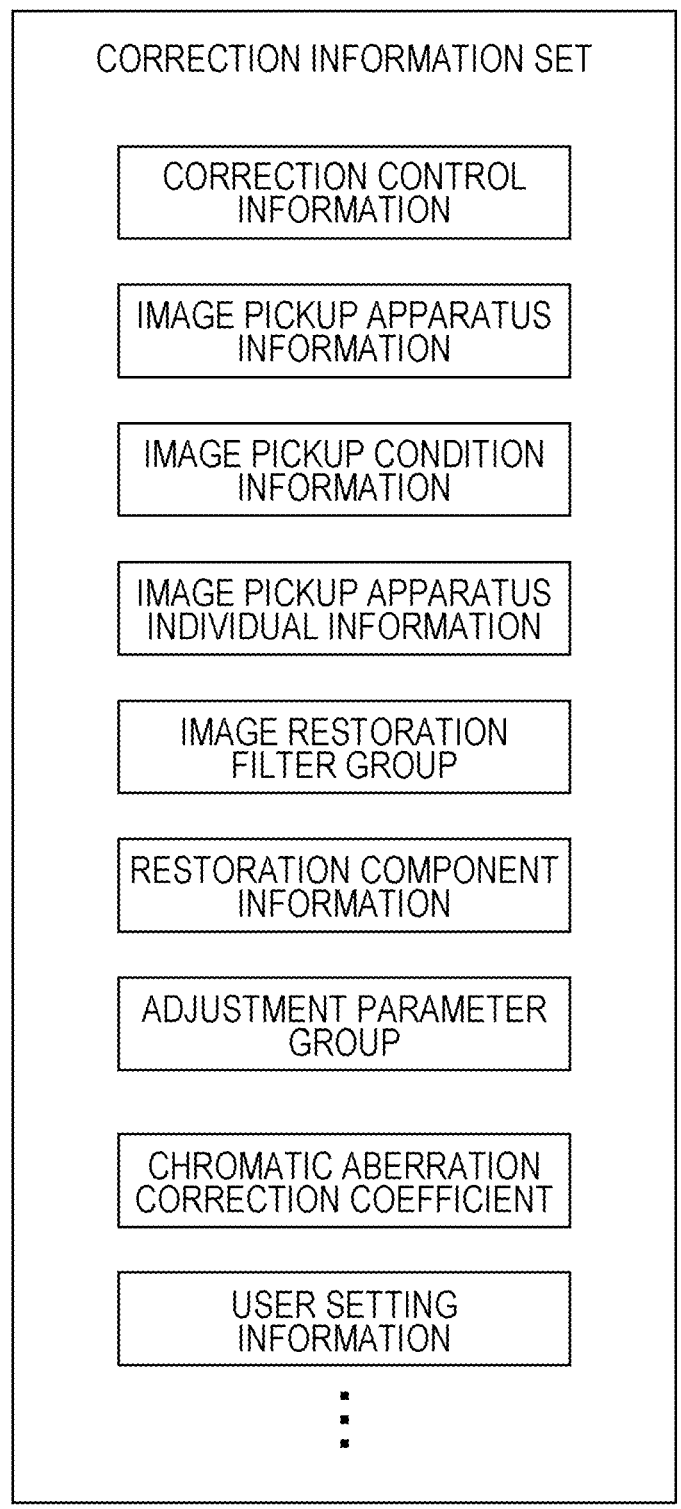
FIG. 17 is a diagram explaining a correction information set.
Figure 18:
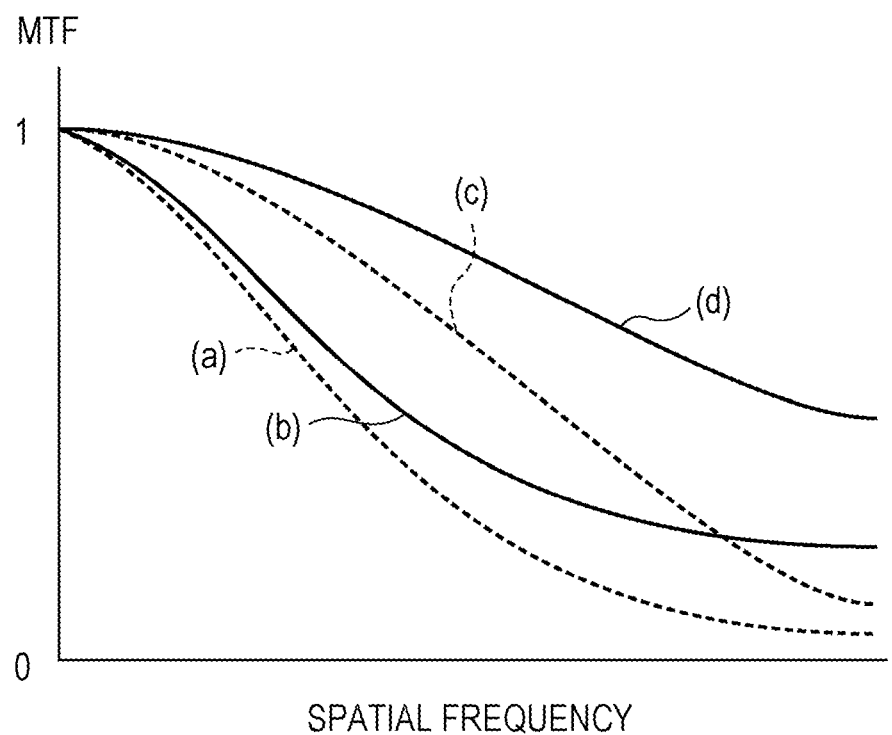
FIG. 18 is a diagram explaining conventional image restoration.

Here, the content of correction information for performing an image restoration process including a correction process for the phase degradation component and the amplitude degradation component, and image processing including the adjustment of the degree of restoration, and the delivery thereof will be described. FIG. 17 illustrates an example of the correction information, and the plurality of pieces of correction information is referred to as a correction information set. Each piece of correction information will be described hereinafter.

"Correction Control Information"

Correction control information includes setting information indicating which of the image pickup apparatus 113, the image processing apparatus 111, and the output device 116 is to perform a correction process, and selection information for selecting data to be transmitted to another device in accordance with the setting information. For example, if the image pickup apparatus 113 performs only an image restoration process and the image processing apparatus 111 adjusts the degree of restoration, it is not necessary to transmit the image restoration filter to the image processing apparatus 111. However, it is necessary to transmit at least the second image and the first image or the restoration component information.

"Image Pickup Apparatus Information"

Image pickup apparatus information is identification information about the image pickup apparatus 113 corresponding to the name of the product. If the lens and the camera body are replaceable, the identification information includes the combination of them.

"Image Pickup Condition Information"

Image pickup condition information is information regarding the state of the image pickup apparatus 113 during photographing. Examples of the image pickup condition information include the focal length (zoom position), aperture value, object distance (focus distance), ISO sensitivity, and white balance setting.

"Image Pickup Apparatus Individual Information"

Image pickup apparatus individual information is identification information about an individual image pickup apparatus with respect to the image pickup apparatus information described above. Due to the non-uniform manufacturing errors, the optical transfer function (OTF) of the image pickup apparatus vary from one entity to another. The image pickup apparatus individual information is effective information to set an individually optimum degree-of-restoration adjustment parameter. The degree-of-restoration adjustment parameter includes the restoration strength adjustment coefficient $\mu$ and the color combination ratio adjustment coefficient $\omega$.

"Image Restoration Filter Group"

An image restoration filter group is a set of image restoration filters used in the image restoration process. If an apparatus that performs an image restoration process includes no image restoration filters, it is necessary to transmit an image restoration filter from another apparatus (device).

"Restoration Component Information"

If an image restoration process has already been performed and restoration component information has been generated, the second image whose phase has been corrected and the restoration component information may be transmitted to another device so that the other device can perform a degree-of-restoration adjustment process.

"Adjustment Parameter Group"

An adjustment parameter group is a set of a color combination ratio adjustment coefficient $\omega$ and a restoration strength adjustment coefficient $\mu$. As described above, the color combination ratio adjustment coefficient $\omega$ and the restoration strength adjustment coefficient $\mu$ can be changed in accordance with the position on the image. The color combination ratio adjustment coefficient $\omega$ and the restoration strength adjustment coefficient $\mu$ can also be changed in accordance with the photographic state. Data of the adjustment parameter group may be table data of adjustment coefficients themselves, or may be a function for determining an adjustment coefficient.

"Chromatic Aberration Correction Coefficient"

As described in Equation 7, a chromatic aberration correction coefficient is a coefficient regarding the mixing ratio between color components of H(u, v) for generating rH(u, v) for each color component. If a device (apparatus) that has determined a chromatic aberration correction coefficient is different from a device (apparatus) that is to perform an image restoration process, the chromatic aberration correction coefficient is transmitted between the devices.

"User Setting Information"

User setting information is an adjustment parameter for adjustment to the degree of restoration desired by a user, or a function for correcting the adjustment parameter. A user can variably set the adjustment parameter, and can always obtain the desired output image as an initial value using the user setting information. Further, in the user setting information, it is preferable that the most favorite sharpness among records with which the user has determined an adjustment parameter be updated by using the learning function.

Furthermore, the provider (vendor) of the image pickup apparatus can also provide preset values corresponding to several sharpness patterns via a network.

The correction information set described above is preferably attached to an individual piece of image data. Attaching necessary correction information to image data allows an apparatus or device including an image processing apparatus to perform an image restoration process and a degree-of-restoration adjustment process. Further, the content of the correction information set can be selected automatically and manually, as necessary. For example, when a different device is to perform a degree-of-restoration adjustment process, if the correction information set includes the second image and the restoration component information, the image restoration filter group is basically unnecessary.

The exemplary embodiments described above are merely typical examples, and a variety of modifications and changes can be made to the exemplary embodiments to implement the present invention.

The present invention is not to be limited to the foregoing embodiments, and a variety of changes and modifications can be made without departing from the spirit and scope of the present invention. Therefore, the following claims are appended to clearly define the scope of the present invention.

It is possible to obtain an image with reduced chromatic aberration as well as improved sharpness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   image acquiring unit configured to acquire an input image; and
   image restoration processing unit configured to generate a restored image by calculating the input image and an image restoration filter, the image restoration filter being based on a transfer function of an image pickup system that is used to form an object image as the input image,
   wherein the image restoration filter is a filter that performs restoration so that when an object is a white point light source, a difference between spectra of two color components in the restored image is made smaller than a difference between spectra of the two color components in the input image.

2. The image processing apparatus according to claim 1, wherein the image restoration processing unit performs image restoration by applying a convolution integral to a pixel in the input image using the image restoration filter.

3. An image pickup apparatus comprising:
an image pickup system that acquires an object image as an input image; and
image restoration processing unit configured to generate a restored image by calculating the input image and an image restoration filter, the image restoration filter being based on a transfer function of the image pickup system,
wherein the image restoration filter is a filter that performs restoration so that when an object is a white point light source, a difference between spectra of two color components in the restored image is made smaller than a difference between spectra of the two color components in the input image.

4. A computer-readable non-transitory medium having instructions that, when executed by a processor, cause the processor to perform operations comprising:
generating a restored image by calculating an image restoration filter and an input image, the image restoration filter being based on a transfer function of an image pickup system that acquires an object image as the input image,
wherein the image restoration filter is a filter that performs restoration so that when an object is a white point light source, a difference between spectra of two color components in the restored image is made smaller than a difference between spectra of the two color components in the input image.

5. An image processing method comprising:
a step of acquiring an input image; and
a step of generating a restored image by calculating the input image and an image restoration filter, the image restoration filter being based on a transfer function of an image pickup system that is used to acquire the input image,
wherein the image restoration filter is a filter that performs restoration so that when an object is a white point light source, a difference between spectra of two color components in the restored image is made smaller than a difference between spectra of the two color components in the input image.

6. An image processing apparatus comprising:
image acquiring unit configured to acquire an input image; and
image restoration processing unit configured to generate a restored image by calculating the input image and an image restoration filter, the image restoration filter being based on a transfer function of an image pickup system that is used to form an object image as the input image,
wherein the image restoration filter is a filter that performs restoration so that a difference between absolute values of a first transfer function of a first color component and a second transfer function of a second color component after restoration is smaller than a difference between absolute values of the first transfer function and the second transfer function before restoration.

7. An image processing apparatus comprising:
image acquiring unit to acquire an input image; and
image restoration processing unit configured to generate a restored image by calculating the input image and an image restoration filter, the image restoration filter being based on a transfer function of an image pickup system that is used to form an object image as the input image,
wherein the image restoration filter is generated on the basis of the transfer function of the image pickup system and a correction transfer function that has been corrected so that a difference between absolute values of a first transfer function of a first color component and a second transfer function of a second color component after restoration is smaller than a difference between absolute values of the first transfer function and the second transfer function before restoration.

8. A computer-readable non-transitory medium having instructions that, when executed by a processor, cause the processor to perform operations comprising:
acquiring an input image; and generating a restored image by calculating the input image and an image restoration filter,
the image restoration filter being based on a transfer function of an image pickup system that is used to form an object image as the input image,
wherein the image restoration filter is filter that performs restoration so that a difference between absolute values of a first transfer function of a first color component and a second transfer function of a second color component after restoration is smaller than a difference between absolute values of the first transfer function-and the second transfer function before restoration.

9. An image pickup apparatus comprising:
an image pickup system that acquires an object image as an input image; and
image restoration processing unit configured to generate a restored image by calculating the input image and an image restoration filter, the image restoration filter being based on a transfer function of the image pickup system,
wherein the image restoration filter is a filter that performs restoration so that a difference between absolute values of a first transfer function of a first color component and a second transfer function of a second color component after restoration is smaller than a difference between absolute values of the first transfer function and the second transfer function before restoration.

10. An image processing method comprising:
a step of acquiring an input image; and
a step of generating a restored image by calculating the input image and an image restoration filter, the image restoration filter being based on a transfer function of an image pickup system that is used to form an object image as the input image,
wherein the image restoration filter is a filter that performs restoration so that a difference between absolute values of a first transfer function of a first color component and a second transfer function of a second color component after restoration is smaller than a difference between absolute values of the first transfer function and the second transfer function before restoration.

11. A computer-readable non-transitory medium having instructions that, when executed by a processor, cause the processor to perform operations comprising:
acquiring an input image; and
generating a restored image by calculating the input image and an image restoration filter, the image restoration filter being based on a transfer function of an image pickup system that is used to form an object image as the input image,
wherein the image restoration filter is generated on the basis of the transfer function of the image pickup system and a correction transfer function that has been corrected so that a difference between absolute values of a first transfer function of a first color component and a second transfer function of a second color component after restoration is smaller than a difference between absolute values of the first transfer function and the second transfer function before restoration.

12. An image pickup apparatus comprising:

an image pickup system that acquires an object image as an input image; and image restoration processing unit configured to generate a restored image by calculating the input image and an image restoration filter, the image restoration filter being based on a transfer function of the image pickup system, wherein the image restoration filter is generated on the basis of the transfer function of the image pickup system and a correction transfer function that has been corrected so that a difference between absolute values of a first transfer function of a first color component and a second transfer function of a second color component after restoration is smaller than a difference between absolute values of the first transfer function and the second transfer function before restoration.

13. An image processing method comprising:

a step of acquiring an input image; and a step of generating a restored image by calculating the input image and an image restoration filter, the image restoration filter being based on a transfer function of an image pickup system that is used to form an object image as the input image, wherein the image restoration filter is generated on the basis of the transfer function of the image pickup system and a correction transfer function that has been corrected so that a difference between absolute values of a first transfer function of a first color component and a second transfer function of a second color component after restoration is smaller than a difference between absolute values of the first transfer function and the second transfer function before restoration.

\* \* \* \* \*